US008566163B2

(12) United States Patent
Adams et al.

(10) Patent No.: US 8,566,163 B2
(45) Date of Patent: Oct. 22, 2013

(54) METHODS AND SYSTEMS FOR GENERATING A TRADE CALENDAR

(75) Inventors: Gary L. Adams, Wheaton, IL (US); Christian J. Langpape, Mauer (DE)

(73) Assignee: SAP AG, Walldorf (DE)

( * ) Notice: Subject to any disclaimer, the term of this patent is extended or adjusted under 35 U.S.C. 154(b) by 2236 days.

(21) Appl. No.: 10/865,826

(22) Filed: Jun. 14, 2004

(65) Prior Publication Data

US 2005/0278217 A1    Dec. 15, 2005

(51) Int. Cl.
*G06Q 30/00* (2012.01)

(52) U.S. Cl.
USPC ...................................... 705/14.64

(58) Field of Classification Search
None
See application file for complete search history.

(56) References Cited

U.S. PATENT DOCUMENTS

| | | | | |
|---|---|---|---|---|
| 5,974,396 | A * | 10/1999 | Anderson et al. | 705/10 |
| 6,151,582 | A * | 11/2000 | Huang et al. | 705/8 |
| 6,502,076 | B1 * | 12/2002 | Smith | 705/14 |
| 6,519,571 | B1 * | 2/2003 | Guheen et al. | 705/14 |
| 6,871,183 | B2 * | 3/2005 | Gilday et al. | 705/10 |
| 7,047,251 | B2 * | 5/2006 | Reed et al. | 707/102 |
| 7,080,026 | B2 | 7/2006 | Singh et al. | |
| 7,139,793 | B2 | 11/2006 | Lala et al. | |
| 7,155,402 | B1 * | 12/2006 | Dvorak | 705/10 |
| 2002/0065767 | A1 | 5/2002 | Manabe et al. | |
| 2002/0123957 | A1* | 9/2002 | Notarius et al. | 705/37 |
| 2002/0199182 | A1* | 12/2002 | Whitehead | 725/1 |
| 2003/0018513 | A1 | 1/2003 | Hoffman et al. | |
| 2003/0040970 | A1* | 2/2003 | Miller | 705/26 |
| 2003/0069774 | A1 | 4/2003 | Hoffman et al. | |
| 2003/0083947 | A1 | 5/2003 | Hoffman et al. | |
| 2003/0216958 | A1* | 11/2003 | Register et al. | 705/14 |
| 2003/0220830 | A1* | 11/2003 | Myr | 705/10 |
| 2004/0093281 | A1* | 5/2004 | Silverstein et al. | 705/26 |
| 2004/0122735 | A1* | 6/2004 | Meshkin | 705/14 |
| 2004/0128198 | A1* | 7/2004 | Register et al. | 705/14 |
| 2004/0172341 | A1 | 9/2004 | Aoyama et al. | |
| 2004/0193478 | A1 | 9/2004 | Miller et al. | |
| 2005/0177422 | A1 | 8/2005 | Schuller et al. | |
| 2005/0197896 | A1 | 9/2005 | Veit et al. | |
| 2005/0216354 | A1 | 9/2005 | Bam et al. | |
| 2005/0261954 | A1 | 11/2005 | Aoyama et al. | |
| 2005/0278211 | A1 | 12/2005 | Adams et al. | |
| 2005/0278218 | A1 | 12/2005 | Adams et al. | |
| 2005/0278236 | A1 | 12/2005 | Adams et al. | |
| 2006/0047560 | A1 | 3/2006 | Adams et al. | |
| 2006/0085246 | A1 | 4/2006 | Li | |
| 2007/0150380 | A1 | 6/2007 | Lee | |
| 2007/0156531 | A1 | 7/2007 | Schuller et al. | |

OTHER PUBLICATIONS

Website information from Siebel.*
Website information from Chordiant.*
Kotler, Philip, Marketing Management, Prentice-Hall, 7th Edition, 1991, pp. 68-69.

* cited by examiner

*Primary Examiner* — Colleen Hoar
(74) *Attorney, Agent, or Firm* — Finnegan, Henderson, Farabow, Garrett & Dunner, L.L.P.

(57) ABSTRACT

Methods and systems consistent with the present invention provide for generating a trade calendar. A trade calendar module launches a query comprising search criteria for searching information pertaining to trade promotions. The trade calendar module then populates a trade calendar with information responsive to the query, including each trade promotion that meets the search criteria. The trade calendar module also causes the trade calendar to be displayed the trade calendar. The trade calendar simultaneously displays marketing activities corresponding to a portion of the information in the trade calendar.

71 Claims, 15 Drawing Sheets

METHODS AND SYSTEMS FOR GENERATING A TRADE CALENDAR

RELATED APPLICATIONS

The present application relates to U.S. patent application Ser. No. 10/865,827, entitled "SYSTEMS AND METHODS FOR INTEGRATED PROMOTION PLANNING,"; U.S. patent application Ser. No. 10/865,828, entitled "SYSTEMS AND METHODS FOR INTEGRATED MARKET ACCOUNT PLANNING,"; U.S. patent application Ser. No. 10/865,848, entitled "SYSTEMS AND METHODS FOR INTEGRATING PROMOTION PLANNING WITH PROMOTION EXECUTION,"; and U.S. patent application Ser. No. 10/865,998, entitled "SYSTEMS AND METHODS FOR PLANNING TRADE DEALS," all of which are expressly incorporated herein by reference in their entirety.

TECHNICAL FIELD

The present invention relates generally to data processing systems and, more particularly, to methods and systems for generating a trade calendar.

BACKGROUND

In today's product saturated and consumer-driven markets, it is essential for consumer products (CP) manufacturers to recognize consumer demands and priorities and to deliver brand messages to these consumers. CP companies can handle message delivery by advertising in a variety of media and with promotions aimed directly at consumers. It is also critical that manufacturers develop productive relationships with their direct customers, the retailers, since consumers generally purchase from retailers.

In most markets, the consumer has a choice of outlets to shop, including retail grocery stores, mass merchandiser warehouse stores, drug stores, and convenience stores. Given that the retailer has limited shelf space to present products, the way that manufacturers offer their products in contrast to the competition is vital to gaining product distribution, placement, pricing and promotion at each retailer account. Manufacturers have the challenge of delivering the right product, in the right place, at the right time, and at the right price.

To succeed in planning and executing this, retailer-centric data needs to be captured and visible to each stakeholder responsible for the retailer interaction process within a manufacturer's enterprise. Those responsibilities can include analyzing, planning, selling, executing, validating, or evaluating any of the product processes used to enlist retail customers in promoting a manufacturer's products to consumers.

Consolidation and globalization across the retail market space have reduced the number of retailers that are available to engage; therefore, manufacturers now need better retailer management processes than ever before to succeed. Not only do manufacturers need to know which consumers are looking to purchase what product, but they must also understand each retailer's strategy for attracting consumers to specific outlets. Competitive product information helps manufacturers understand the factors that cause one manufacturer's products to sell better than the competitors' products. It also enables manufacturers to drive retailer support of products that are either most profitable or offer the greatest sales opportunities.

A current trend is for manufacturers to manage each retailer as a unique partner and apply resource support to retailers in varying degrees. Every day, manufacturers must decide how to sell to retailers that are large in terms of volume or profit, while also selling to retailers that present a smaller opportunity. Some retailers require more personal interaction than others do, resulting in higher costs associated with those retailers.

Some large retailers remain that desire regular, face-to-face contact with manufacturers. However, some smaller retailers may be amenable to manufacturer contact via the Internet and private exchanges. As electronic processes change for the better, manufacturers can determine which model plays best for its business and products with the aid of electronic customer relationship management (CRM) solutions.

CRM covers more than just automatic handling of marketing, service, and sales processes and the step-by-step improvement of process efficiency. Based on high-quality information, it also covers interactions, and aims to provide retailers with tailored solutions for their particular requirements. The success of an enterprise depends on its ability to synchronize marketing, sales, finance, operations, logistics, and retailer service efforts to generate the maximum benefit from the information available about retailers and consumers.

The most important aim of marketing activities in the CP industry is to increase the value of the brand, also known as brand capital. In other words, brand awareness leads to an increase in sales volumes and market share, and enhances the introduction of new products to the market, resulting in increased brand capital. Developing demand for a product in the minds of consumers is the goal of brand marketing.

To achieve these aims, all marketing activities must be included in a cross-enterprise, global marketing and sales strategy. CP companies use three basic marketing components to position products for consumers, and these components work best when synchronized:

Media campaigns—Media campaigns are conducted via TV, print media, the Internet, or other communication channels and are directed at anonymous consumers who are grouped by buying or usage behavior.

Consumer promotion—The aim of consumer promotion is to increase product sales by providing incentives directly to the consumer. Programs, such as coupons, sweepstakes, continuity programs, free goods, and giveaways, all provide the consumer with additional reasons to purchase a specific manufacturer's products.

Trade promotions or merchandising event planning—In some cases, retail outlets offer the only opportunity that a manufacturer has to place a product before consumers. To accomplish this, account managers negotiate with retailers, presenting promotion proposals to feature, display, or reduce the price of the product for a short period of time. This usually results in consumers (both existing and new) purchasing the product on promotion more frequently or in greater quantity (pantry loading) than they ordinarily would without a promotion.

SUMMARY

Methods and systems consistent with the present invention provide for generating a trade calendar. A trade calendar module launches a query comprising search criteria for searching information pertaining to trade promotions. The trade calendar module then populates a trade calendar with information responsive to the query, including each trade promotion that meets the search criteria. The trade calendar module also causes the trade calendar to be displayed the trade calendar. The trade calendar simultaneously displays marketing activities corresponding to a portion of the information in the trade calendar.

Other methods and systems consistent with the present invention provide for generating a trade calendar. A trade calendar module launches a query comprising search criteria for searching stored deal information and populates a trade calendar with results from the launched query. The results comprise each deal from the deal information that meets the search criteria. The trade calendar module may also cause the trade calendar to be displayed so that at least a portion of the results is displayed. Furthermore, the trade calendar module creates a trade promotion from a deal selected from the displayed trade calendar and requests approval for the trade promotion. Once the trade calendar module has received approval information corresponding to the trade promotion, it updates the trade calendar based on the approval information.

BRIEF DESCRIPTION OF THE DRAWINGS

The accompanying drawings, which are incorporated in and constitute a part of this specification, illustrate one embodiment of the invention and, together with the description, serve to explain the principles of the invention.

DETAILED DESCRIPTION

Reference will now be made in detail to exemplary embodiments of the present invention, examples of which are illustrated in the accompanying drawings. Wherever possible, the same reference numbers will be used throughout the drawings to refer to the same or like parts. While the description includes exemplary embodiments, other embodiments are possible, and changes may be made to the embodiments described without departing from the spirit and scope of the invention. The following detailed description does not limit the invention. Instead, the scope of the invention is defined by the appended claims and their equivalents.

Overview

Methods and systems consistent with the present invention provide for generating a trade calendar. A trade calendar module launches a query comprising search criteria for searching stored deal information and populates a trade calendar with results from the launched query. The results comprise each deal from the deal information that meets the search criteria. The trade calendar module may also cause the trade calendar to be displayed so that at least a portion of the results is displayed. Furthermore, the trade calendar module creates a trade promotion from a deal selected from the displayed trade calendar and requests approval for the trade promotion. Once the trade calendar module has received approval information corresponding to the trade promotion, it updates the trade calendar based on the approval information.

Trade Promotion Management

Figure 1:
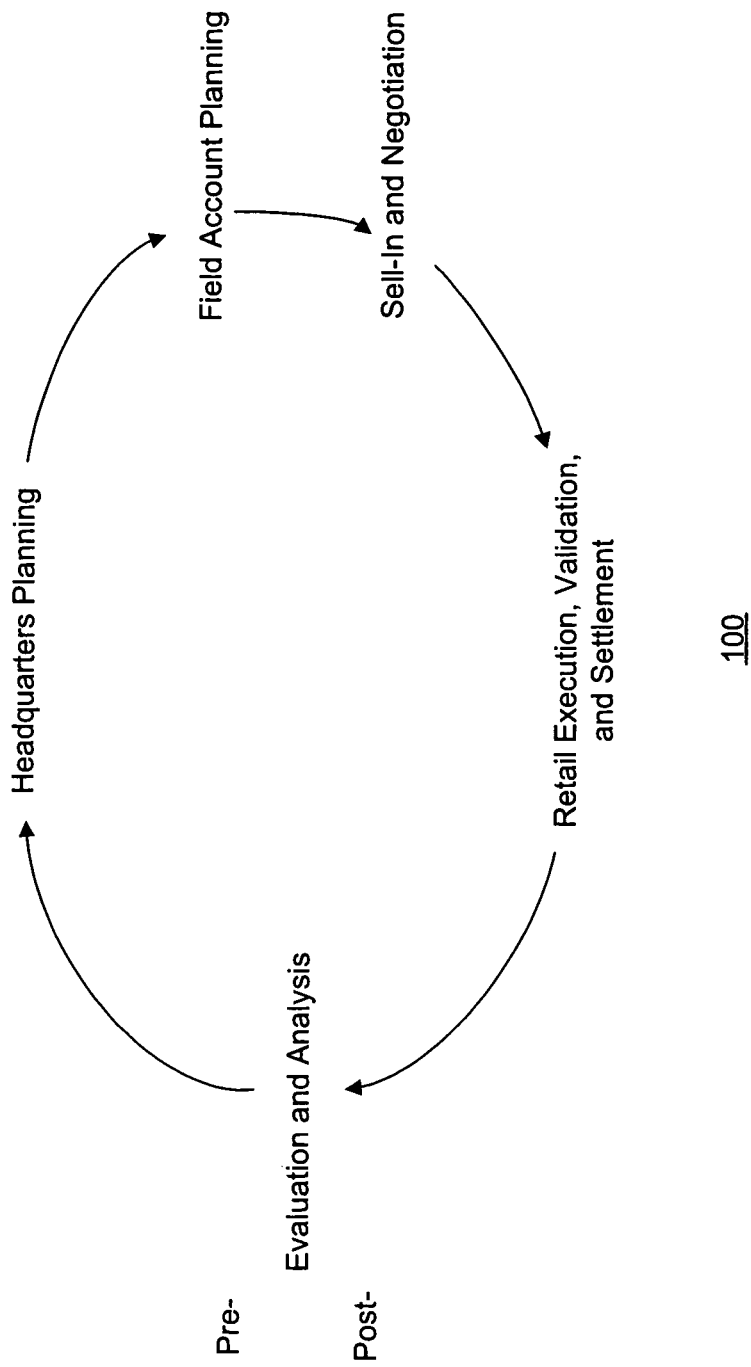
FIG. 1 is a diagram of a trade promotion management process.

A trade promotion management (TPM) process is illustrated in FIG. 1. TPM process 100 includes: pre-evaluation and analysis; headquarters planning; field account planning; sell-in and negotiation; retail execution, validation, and settlement; and post-evaluation and analysis.

Several people may be involved in TPM process 100. These people may include trade marketing managers, account managers, and field sales representatives. Trade marketing managers are generally responsible for forming sales strategy, developing a trade marketing plan, coordinating trade marketing for activities, planning the budget for trade promotions and monitoring the budget availability, and observing the market and competitors. Account managers are in charge of accounts associated with specific retailers. Account managers, for example, may be responsible for identifying accounts that promise the biggest return on investment (ROI); identifying the most successful brands and strategies for their accounts; creating forecasts on sales, turnover, and ROI; and planning, running, and monitoring events such as trade promotions. Field sales representatives are responsible for selling products or services to specific stores of a retailer, executing sales activities, etc.

Pre-evaluation and analysis focuses on reviewing the historical volume and types of promotional activity that have taken place for a company's own products and for competitive products. Critical to this analysis is an understanding of baseline volume and the effect that various types of merchandising event tactics have on incremental volume. Baseline volume may refer to volume achieved during normal activity (e.g., when no trade promotions are in effect).

During headquarters planning, both sales volume and marketing spending objectives are set in place. For example, a planner may set goals for quantities to be sold of particular products, or goals for amounts to be spent on marketing. To support achievement of these objectives, event-planning structures can be created and delivered to the sales teams. Once the number and type of trade promotions have been defined within the brand strategy, trade marketing managers develop both the event planning structure and performance objectives. This information is created and delivered to the account management team (e.g., one or more account managers) within a sales organization for specific merchandising event planning. After the planning concludes, the data is forwarded to a production planner to coordinate the requirements.

During field account planning, the planning information received from headquarters allows an account manager to create both a tactical merchandising event plan and a sales forecast. After account planning, an account manager may set up meetings with the retailer's merchandiser. At these meetings, the account manager presents fact-based proposals for promoting products in the retailer's stores during the requested time periods. During these meetings, the account manager shows the retailer how promoting the manufacturer's products can support the retailer's goal of increasing store traffic, category profitability, and market share.

Retail execution, validation, and settlement is comprised of three phases. First, the field sales representative receives the account promotion plan from the account manager and plans the presales store visits. During these visits, the field sales representative presents the promotions to the store manager or decision maker for the store, and attempts to sell additional floor stock and sales collateral to support the promotion. Second, during each store visit, the field sales representative also checks on current promotions and notes if they are, in fact, in place at the appropriate price. The representative also checks for distribution, placement, and regular pricing conditions, and sends items that need correction back to the account manager for resolution with the retailer. Third, the retailer periodically places orders for the manufacturer and other's products. The retailer and the manufacturer systems apply pricing conditions to each order, invoice, and shipment to ensure that funds are being transferred at the appropriate time.

During post evaluation and analysis, as promotions are executed both headquarters and field sales planning teams check on the outcome of the activity. A manufacturer can quickly assess which promotions are working and which are not by comparing actual numbers to plan numbers as they occur.

Network Environment

Figure 2:
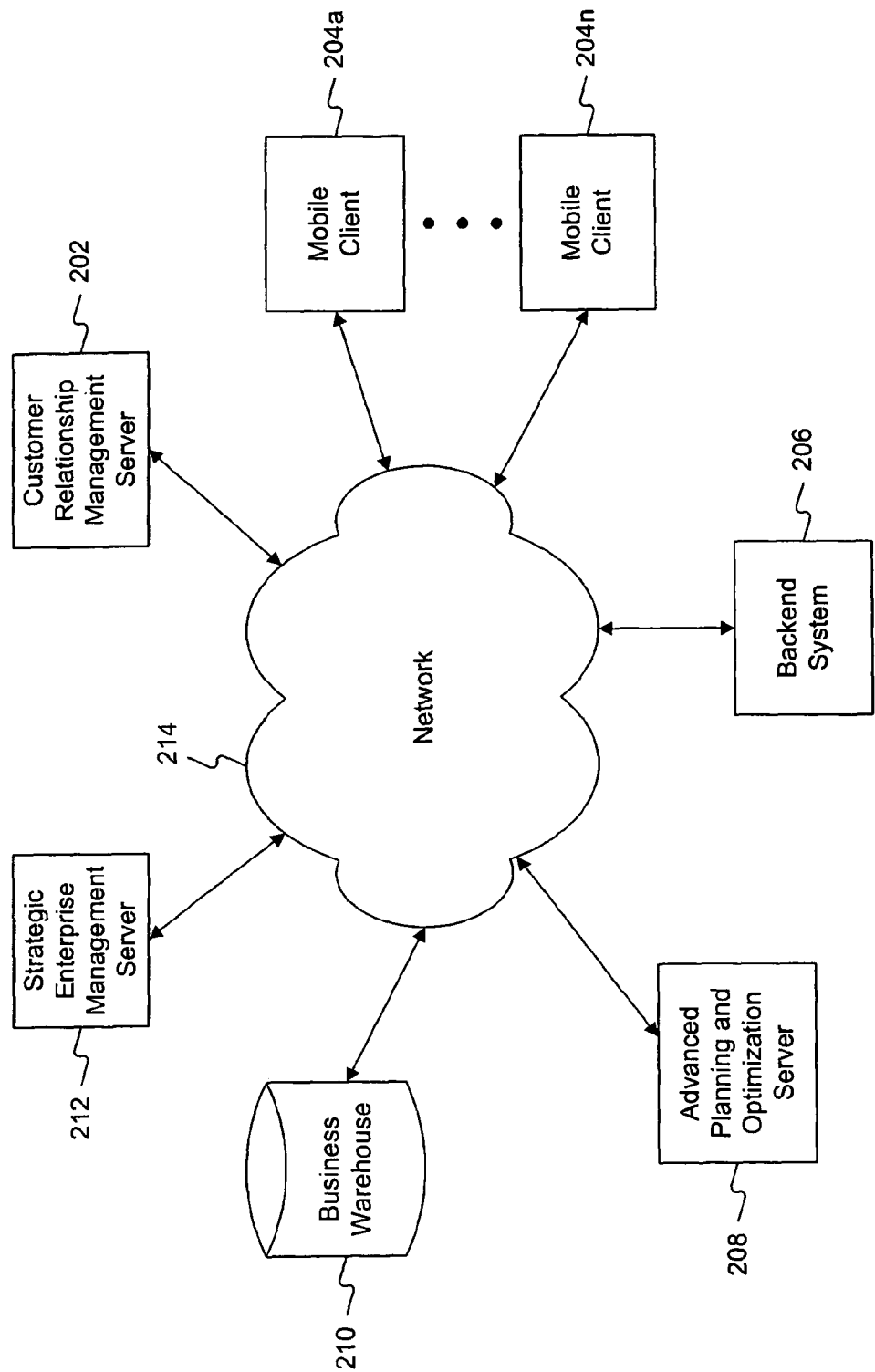
FIG. 2 is a diagram of an exemplary network environment in which features and aspects consistent with the principals of the present invention may be implemented.

FIG. 2 is a block diagram of a network environment 200, in which features and aspects consistent with the present invention may be implemented. The number of components in environment 200 is not limited to what is shown and other variations in the number of arrangements of components are possible, consistent with embodiments of the invention. The components of FIG. 2 may be implemented through hardware, software, and/or firmware. Network environment 200 may include customer relationship management (CRM) server 202, mobile clients 204a-204n, backend system 206, advanced planning and optimization (APO) server 208, business warehouse 210, strategic enterprise management (SEM) server 212, and network 214.

Network 214 may be a shared, public, or private network and encompass a wide area or local area. Network 214 may be implemented through any suitable combination of wired and/or wireless communication networks. By way of example, network 214 may be implemented through a wide area network (WAN), local area network (LAN), an intranet and/or the Internet. Because of the nature of the information in CRM server 202, which may be confidential, access to it may be through a Virtual Private Network (VPN).

CRM server 202 provides functions that support processes involving retailer contact throughout the entire retailer relationship cycle—from market segmentation, sales lead generation and opportunities to post-sales and retailer service. CRM server 202, for example, includes several modules that implement various functions associated with trade promotion management. Exemplary functions of CRM server 202 are explained further below with reference to FIG. 3.

Mobile clients 204a-204n may be used by an account manager, sales representative, or other user to perform their day-to-day activities such as planning, running, and monitoring trade promotions, executing sale activities, etc. Mobile clients 204a-204n, for example, may be operable to receive deal information from CRM server 202 and use that information to populate a trade calendar or other planning tool that may be displayed on a mobile client 204. The account manager may plan trade promotions from the deals displayed in the trade calendar. Trade promotion data and other data entered in mobile client 204 typically is synchronized with data in CRM server 202. Mobile client 204 may also be used to access other functionality that aids the account manager or other user in his or her duties. Such functionality may be accessed from the trade calendar or from other applications.

Backend system 206 may be operable to provide enterprise resource planning functionality. In the context of the trade promotions management, such functionality may include, for example, receiving information pertaining to trade promotions, determining whether a sales order from a retailer relates to a trade promotion, and updating invoices and other payment documents when a sales order does relate to a trade promotion.

APO server 208 may be operable to track item level forecasts for shipments and identify any potential supply problems. For example, APO server 208 may send baseline demand information (e.g., consumer demand for non-promoted items) to CRM server 202, and in turn receive an aggregated volume forecast from CRM server 202. The aggregated forecast may take both promoted and non-promoted items into consideration. When APO server 208 detects that the aggregations extend past the ability to supply, APO server 208 may generate an appropriate alert.

Business warehouse 210 may be a database that can be used to collect data from various sources, including CRM server 202, mobile clients 204a-204n, backend system 206, APO server 208, SEM server 212, or other sources. Exemplary data stored in business warehouse 210 may include, for example, deal information reflecting deals created by a trade promotion manager, trade promotion data reflecting trade promotions created by an account manager, historical data related to specific retailers and products, customer (e.g., retailer) information, product information, budget information, marketing activity information, etc. Business warehouse 210 may also include reporting and alerting capabilities to present the stored information to a user.

SEM server 212 may be generally operable to support various management processes, including top-down translation of enterprise strategy into business unit strategy, product strategy, support center strategy and so on, and bottom-up performance monitoring and related decision support.

Figure 3:
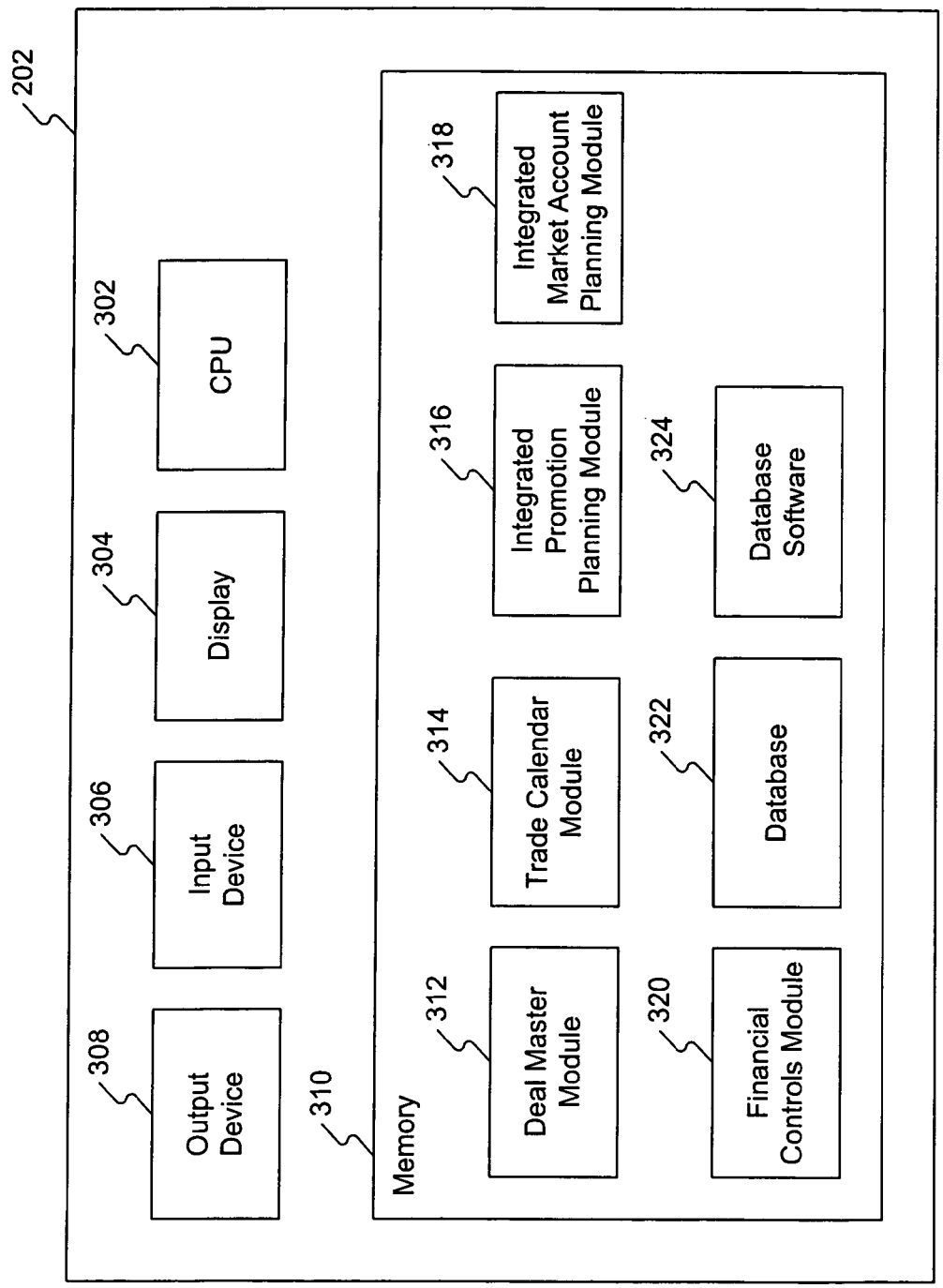
FIG. 3 is a diagram of an exemplary CRM server, consistent with the principals of the present invention.

FIG. 3 is a diagram of an exemplary CRM server consistent with the principals of the present invention. A CRM server, such as CRM server 202, may include CPU 302, display 304, input device 306, output device 308, and memory 310. Memory 310 may include several modules for use in performing trade promotion management. These modules may include deal master module 312, trade calendar module 314, integrated promotion planning module 316, integrated market account planning module 318, financial controls module 320, database 322, and database software 324. The number of components in CRM server 202 is not limited to what is shown and other variations in the number of arrangements of components are possible, consistent with embodiments of the invention.

Control of CRM server 202 as well as data input by a user may be achieved through input device 306, which may comprise a keyboard, a pointer device, a stylus, a mouse, speech recognition devices, or document, video, or image input devices, or a combination of these types of devices. Data output may be presented to a user of CRM server 202 through display 304 and/or another output device 308 (such as a printer, or sound or speech output devices). Memory 310 may be one or more storage devices configured to store data used by CPU 202 to perform certain functions related to embodiments of the present invention. Memory 310 may be a magnetic, semiconductor, tape, optical type of storage device, or other data storage mediums, such as a hard drive, CD-ROM drive, DVD drive, floppy drive, etc., or a combination thereof.

CPU 302 may be one or more known processing devices, such as a Pentium™ microprocessor manufactured by Intel Corporation. CPU 302 may execute software programs for implementing the processes described below with respect to, for example, FIGS. 4-5, 7-8, and 10-12. One skilled in the art will appreciate that although FIG. 3 shows one CPU, multiple CPUs may execute the aforementioned software programs. These software programs may reside in memory 310 of CRM server 202. For instance, memory 310 may include database 322, which may store data that relates to the trade promotion management functions performed by CRM server 202. Such functions may be facilitated by deal master module 312, trade calendar module 314, integrated promotion planning module 316, integrated market account planning module 318, and financial controls module 320.

Database software 324 is operable to manipulate the records of database 320. In one embodiment, software 324 may interact with the various modules stored in memory 310 to process records and other information stored in database 322. Thus, for example, software 324 may be relational database software that may interface with any software module or program that may query, sort, segment, or generate reports by processing records stored in database 322. One skilled in the art will appreciate that object oriented techniques or other computational techniques may also be used consistent with the present invention to manipulate records stored in database 322. Indeed, based on object oriented techniques, records stored in database 322 may be represented as objects and may not be stored as part of any table. In other words, database 322 and software 324 are merely exemplary, and records, or equivalents thereof, may be processed using other known computing techniques and arrangements.

One skilled in the art will appreciate that the data of database 322 and the processes implemented by software 324 may be combined or distributed in a variety of ways that are all consistent with the present invention. Indeed, database 322 and database software 324 may be stored in any combination of memories, such as those located in a distributed computing network, and thus need not be located on the same computer system.

Memory 310 may further include deal master module 312, trade calendar module 314, integrated promotion planning module 316, integrated market account planning module 318, and financial controls module 320. Software from these modules, when executed by CPU 302 for example, may provide functionality associated with, for example, the operations described below in connection with the flow charts of FIGS. 4-5, 7-8, and 10-12, discussed below. Deal master module 312 provides functionality that enables a trade marketing manager to create deals. A deal is a set of promotional constraints that may be applied to a pre-defined set of customers (e.g., retailers) for pre-defined products. Deals are used as templates for trade promotions. Deals are created at the headquarter level by the trade marketing manager and are distributed to and used by the account manager to create account level trade promotions. An account manager can accept the planning suggestions from the trade marketing managers or can modify a trade promotion created from a deal. However, the trade promotion must stay within the functional limits stated by the deal.

Trade calendar module 314 may be operable to provide a trade calendar, a user interface that acts as a central entry point and provides a working area that gives an account manager an overview of all promotional events within a certain time range, providing basic information, such as the name of a promotion, status and time range in the form of bars (see, e.g., 910 in FIG. 9). The trade calendar also allows the account manager to create new promotions or campaigns by creating a bar directly in the appropriate time range, and to reschedule any planned activities by moving or stretching (advancing the length of) this bar. The calendar also enables the account manager to delete the activity or copy it elsewhere.

Integrated promotion planning module 316 may help integrate promotion planning with demand planning. Generally, promotion planning focuses on brands and promotable groups within brands (e.g., grouping of items that are typically lumped under a single heading for a promotion). Demand planning, on the other hand, continuously forecasts demand by Stock Keeping Unit (SKU), and should be based on baseline demand. Integrated promotion planning module 316, for example, may be operable to receive demand planning data and promotion planning data, and perform tasks such as determining the impact of promotion on baseline demand and generating an adjusted forecast in view of promotion.

Integrated market account planning module 318 may help integrate promotion planning with market account planning. Integrated market account planning module 318, for example, may allow an account manager to gain an understanding of the impact of volume and spending on profitability. It may also allow the account manager to ensure that a complete volume forecast from a retailer perspective is delivered to the supply chain team.

Financial controls module 320 meshes promotion planning with execution and reporting, thereby integrating all relevant components in one process. For example, financial controls module 320 may be operable to receive information pertaining to trade promotions and send that information to backend system 206. In turn, backend system 206 may use that information to more effectively keep track of liabilities owed to retailers due to trade promotions.

Deal Master

Figure 4:
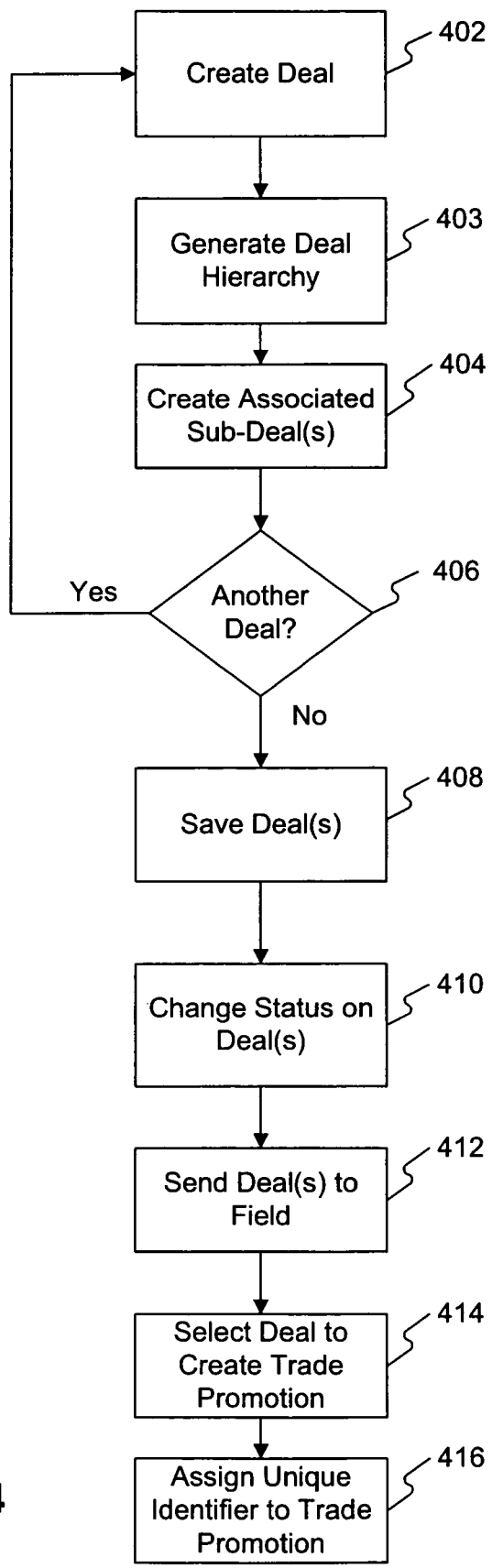
FIG. 4 shows an exemplary flowchart of a method for planning trade deals, consistent with the principals of the present invention.

As noted above with reference to FIG. 3, deal master module 312 provides functionality that enables a trade marketing manager to create deals. FIG. 4 shows a flowchart of a method for planning trade deals in a manner consistent with the present invention. Although the steps of the flowchart are described in a particular order, one skilled in the art will appreciate that these steps may be performed in a modified or different order. Further, one or more of the steps in FIG. 4 may be performed concurrently or in parallel.

First, a user, such as a trade marketing manager, may use the functionality of deal master module 312 to create a deal (step 402). In one embodiment, the user may create the deal through the use of a user interface associated with deal master module 312. This deal may be the top-level deal of a deal hierarchy. For example, a deal hierarchy may include a top-level deal and a number of sub-deals associated with the top-level deal. The top-level deal and associated sub-deals share at least the same promotable group. A deal may include one or more promotable groups or product categories. A promotable group is a group of products that are typically batched together under a single heading for a promotion (e.g., gelatin 3 oz. packages).

Figure 5:
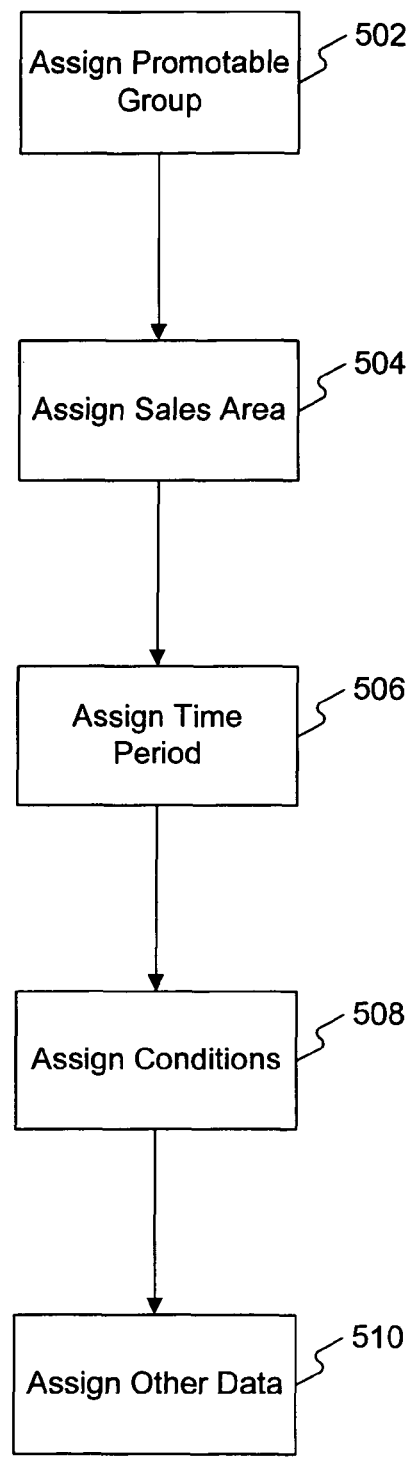
FIG. 5 shows an exemplary flowchart of a method for creating a deal, consistent with the principals of the present invention.

The creating of step 402 is shown in more detail with reference to FIG. 5, which is an exemplary flowchart of a method for creating a deal in a manner consistent with the present invention. Although the steps of the flowchart are described in a particular order, one skilled in the art will appreciate that these steps may be performed in a modified or different order. Further, one or more of the steps in FIG. 5 may be performed concurrently or in parallel.

In FIG. 5, deal master module 312 receives various information from the trade marketing manager and based on that information, assigns parameters to the deal. For example, deal master module 312 assigns a promotable group to the deal based on input from the trade marketing manager (step 502). Deal master module 312 also assigns a sales area to the deal based on input from the trade marketing manager (step 504). A sales area may refer to a section of an organizational structure in which sales activities may be conducted for the deal. In one embodiment, sales area may be modeled geographically so that different sales areas relate to different geographical locations. For example, the trade marketing manager may indicate that a given deal is applicable to all retailers in the United States, that a given deal is applicable to all retailers in the Western United States, or even more specifically, that a given deal is applicable to all retailers in San Francisco. One of ordinary skill in the art will appreciate that different boundaries may be placed on the sales area.

Another parameter associated with a deal is time period. The trade marketing manager may provide information indicating a time period for which the deal is in effect. Deal master module 312 thereafter assigns that time period to the deal (step 506). For example, the trade marketing manager may decide that a given deal should be effective from Jun. 20, 2004 until Jul. 20, 2004.

The trade marketing manager may also choose to associate condition information with the deal, though it is not necessary to do so. If the trade marketing manager does enter condition information for the deal, then deal master module 312 may proceed to assign that condition information to the deal (step 508). A condition, for example, may refer to a discount on a regular price to induce a retailer to accept a promotion. Normally, the trade marketing manager leaves it up to an account manager to determine what a particular condition should be, because the account manager has a better idea of what conditions would persuade the retailer to accept the promotion. However, as noted above, the trade marketing manager has the option of giving a deal condition information. In that case, trade promotions created by the account manager from that deal would need to meet the condition information associated with the deal. Even though the trade marketing manager may associate condition information with a deal, a promotion condition record is not created. Promotion condition records are more fully explained below with reference to FIG. 12.

The trade marketing manager may also choose to associate other data with the deal, though this other data is not necessary to complete the basic framework of the deal. Accordingly, deal master module 312 may assign such other data to the deal (step 510). Exemplary other data may include, for example, promotion type/objectives/tactics, priority, authorization groups, person responsible, currency, buying pattern type, text, documents, status information, etc. Additionally, the deal may include dates for buying the promotional products and/or performing the promotion, historical trends for purchases, volume allocations or forecasts, spending limits, etc. One of ordinary skill in the art will appreciate that each deal may be structured in such a way to ensure that business objectives are met.

Promotion type defines the type of promotion and is used to help categorize individual trade promotions. Exemplary promotion types include price reduction, free goods, displays, and feature advertisements.

Objectives refer to specific goals for a trade promotion. Tactics refer to the preferred means to implement the promotion. Exemplary tactics include display, feature, and reduced price. A priority may be assigned to a trade promotion, reflecting the relative importance of the promotion. Authorization group is an indication of the editing privileges associated with different users. Person responsible refers to the business partner responsible for a trade promotion. Currency refers to the currency used in promotion planning.

Buying pattern type defines the buying pattern for the trade promotion. A buying pattern, for example, is related to how much a retailer buys over a particular period. More particularly, a user may define a buying pattern as a particular length of time, such as two weeks. The user can then plan whether the retailer purchases 20% of the goods in the first week and 80% in the second (any other combination that adds up to 100% is permitted).

Returning to FIG. 4, once the trade marketing manager has finished entering data for the top-level deal, the trade marketing manager may cause deal master module 312 to generate the deal hierarchy (step 403). For example, the trade marketing manager may select, from a user interface, a button, icon, or other user-selectable item that is associated with a function for generating a deal hierarchy. Deal master module 312 may generate a complete or partial deal hierarchy dependent on the number of levels in an assigned business partner hierarchy, with the newly created top-level deal becoming the top node of the hierarchy. A business partner hierarchy is a hierarchy for mapping a business partner's organizational structures. Because deal master module 312 uses the business partner hierarchy as the basis for the deal hierarchy, it is necessary for the trade marketing manager or other user to enter a business partner hierarchy prior to attempting to create a deal hierarchy. In that each deal hierarchy has an associated business partner hierarchy, the business partner hierarchy may be considered to be the retailer associated with the deal hierarchy.

Once the trade marketing manager has selected the button or icon, etc. associated with generating the deal hierarchy, deal master module 312 may request the trade marketing manager to provide an indication of a number of levels that should be associated with the deal hierarchy. Upon receiving the indication, deal master module 312 may proceed to generate the deal hierarchy.

After the deal hierarchy has been generated, deal master module 312 may create the sub-deal(s) associated with the top-level deal, based on input from the trade marketing manager (step 404). When deal master module 312 creates a sub-deal, it initially assigns the same parameters associated with the top-level deal to the sub-deal. In other words, the sub-deal initially has the same promotable group, sales area, time period, condition information (if present), and other data (if present), as the top-level deal. The trade marketing manager may subsequently alter the sales area, time period, condition information, and/or other data, but the promotable group associated with all sub-deals is the same as the top-level deal. In one embodiment, specific products included in the promotable group may be de-selected. In addition, condition information may be de-selected. The sub-deals may be created using a procedure similar to that depicted in FIG. 5, with the exception that there is no need to assign a promotable group. In another embodiment, a top-level deal may not have any sub-deals associated with it.

Generally, the deal hierarchy may be edited. For example, the trade marketing manager may choose to change one or more parameters associated with a top-level deal. By selecting a suitable button, icon, or other mechanism, the trade marketing manager may cause deal master module 312 to ensure that changes made to the top-level deal are copied down to the sub-deals. The data of the sub-deals is then automatically overwritten. In one embodiment, it is possible to prevent changes to be cascaded down to specific sub-deals, if the status of those sub-deals is set to locked, rejected, finished, or any other status that indicates that a sub-deal may no longer be changed.

After all sub-deals for the top-level deal have been created, deal master module 312 makes a determination as to whether the trade marketing manager wants to create another top-level deal (step 406). If so, then processing returns to step 402, where the trade marketing manager may proceed to enter information corresponding to a new top-level deal. If no more deals are to be created, then deal master module 312 may save each of the deals that have been created (e.g., each top-level deal and associated sub-deals are saved) (step 408). In an alternative embodiment, deal master module 312 may save deals as they are being generated, as opposed to waiting until all deals have been created (e.g., each top-level deal and associated sub-deals).

The trade marketing manager also may change the status associated with the deal(s) (step 410). For example, the trade marketing manager may change the status of a deal to a status indicating that the deal is ready to be distributed or otherwise made available to other users, such as account managers. Thereafter, the deal(s) may be sent to the field or otherwise made available to account managers (step 412). For example, the next time an account manager or other user of a mobile client 204 synchronizes the mobile client 204 with CRM server 202, deal master module 312 may send deal information corresponding to the deal(s) ready to be distributed, to the mobile client 204 requesting synchronization. An account manager or other user may also access a deal using CRM server 202 itself instead of a mobile client 204.

Once a set of one or more deals has been accessed by an account manager, whether it be at a mobile client 204 or at CRM server 202, the account manager may select a deal from which a trade promotion is to be created (step 414). The account manager may further create a trade promotion from the selected deal. To create a trade promotion, the account manager may use a trade calendar, such as the one described below with reference to FIGS. 7-9B, or another tool for use in creating trade promotions from deals. For each trade promotion created from deals, a unique identifier is generated and assigned to the trade promotion (step 416). The identifier, for example, may include two sections. One section of the identifier may include a deal identifier that specifies which sub-deal or top-level deal the trade promotion corresponds to. The second section of the identifier may include an account identifier that specifies which account the trade promotion corresponds to.

The identifier allows for effective and efficient management of data associated with the trade promotion. For example, the first section of the identifier enables a user to track all product/brand-related programs that have been established for a planning period. The second section of the identifier may provide a similar capability within the planning cycle for identifying and tracking all retailer-related activity. In one embodiment, the unique identifier may be assigned to the trade promotion as soon as the account manager or other user selects the deal from which the trade promotion is to be created.

Figure 6A:
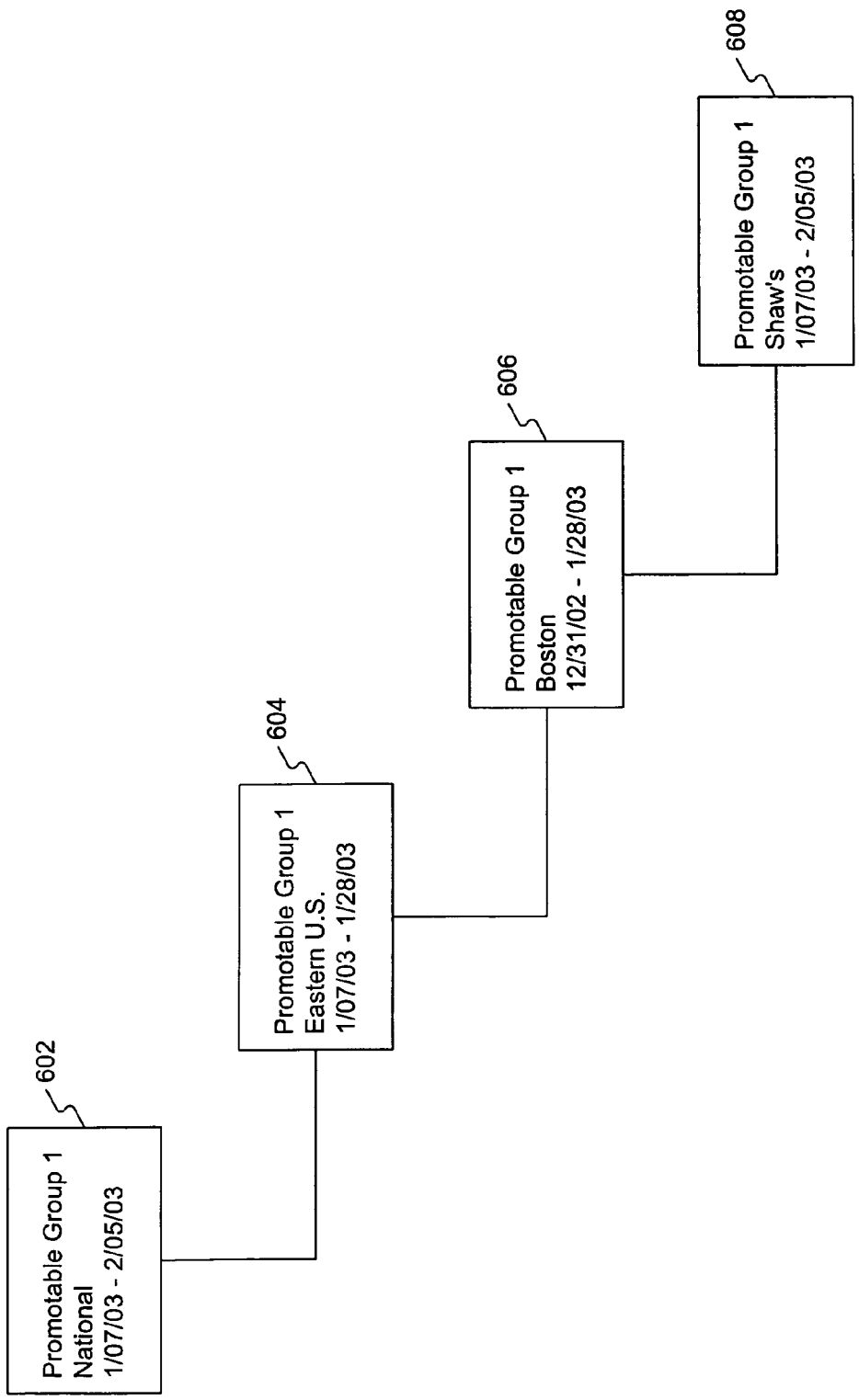
FIGS. 6A and 6B show exemplary deal hierarchies consistent with the present invention.
Figure 6B:
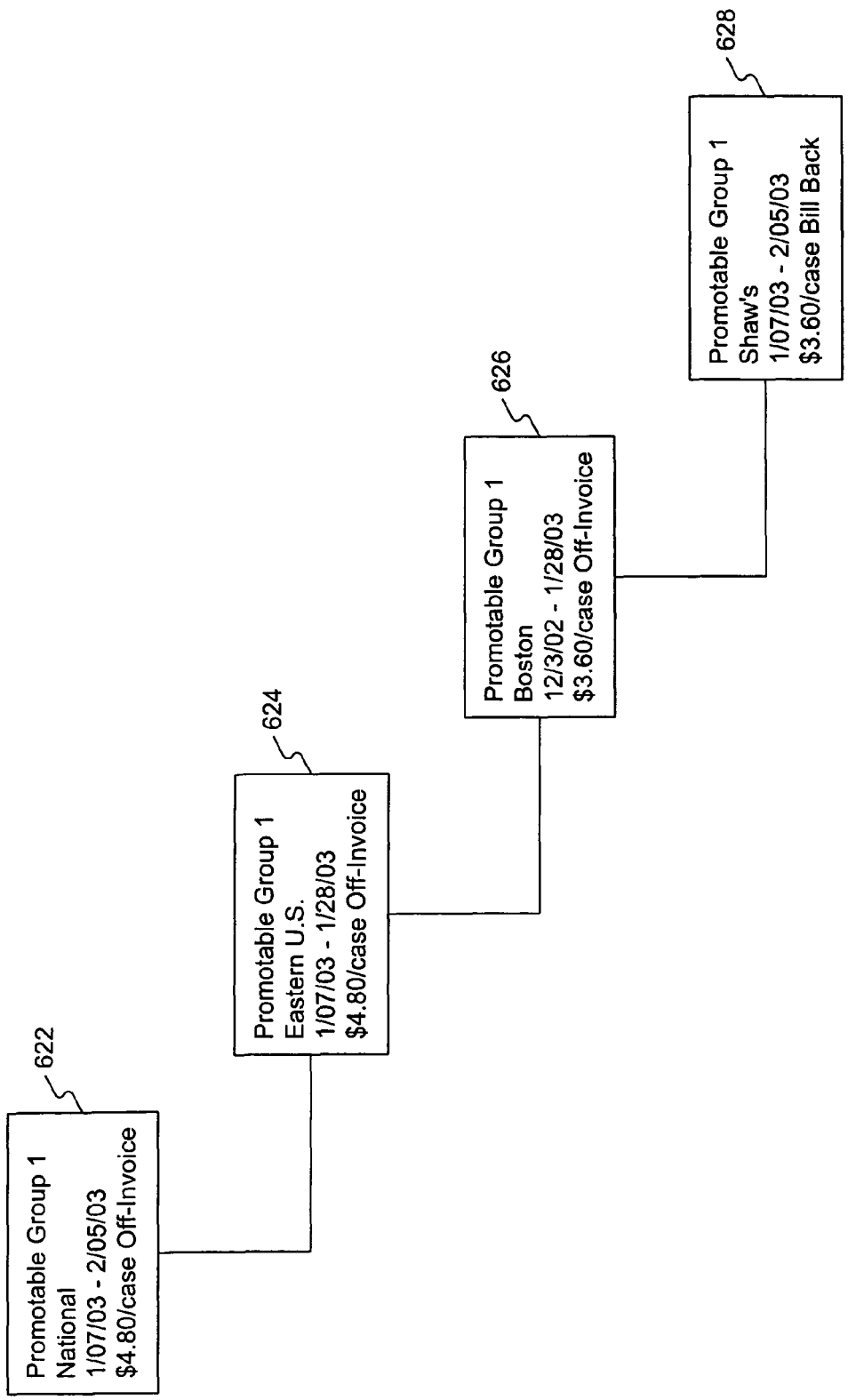

FIGS. 6A and 6B show exemplary deal hierarchies consistent with the present invention. In FIG. 6A, node 602 is a representation of a top-level deal that has been created by deal master module 312. Node 602 includes a promotable group, sales area, and a time period. The promotable group information indicates that the assigned promotable group is promotable group 1. The trade marketing manager or other user, for example, may have previously determined exactly what constitutes promotable group 1. Node 602 also includes sales area information indicating that the deal is effective on a national scale. The time period associated with node 602 indicates that the deal is effective from Jan. 7, 2003 through Feb. 5, 2003.

Nodes 604, 606, and 608 are sub-deals associated with the top-level deal of node 602. Each of node 604, 606, and 608 has promotable group 1 assigned to it. The sub-deals differ, however, in their sales areas and time periods. Node 604, for example, further limits the sales area of node 602 to the Eastern U.S., and changes the time period to Jan. 7, 2003 through Jan. 28, 2003. Node 606 further limits the sales area of node 604 to Boston, and changes the time period to Dec. 31, 2002 through Jan. 28, 2003. Node 608 further limits the sales area of node 606 to a specific retailer, Shaw's, and changes the time period to Jan. 7, 2003 through Feb. 5, 2003. One of ordinary skill in the art will appreciate that nodes 602-608 may have additional information associated with them. Such additional information may include, for example, promotion type/objectives/tactics, priority, authorization groups, person responsible, currency, buying pattern type, etc.

In FIG. 6B, nodes 622-628 are similar to nodes 602-608, respectively, except nodes 622-628 also include condition information associated with them. More particularly, node 622, which represents the top-level deal in the deal hierarchy depicted in FIG. 6B, includes condition information reflecting a $4.80 discount per case, where the discount is to come off-invoice. An off-invoice discount refers to a discount that is applied to the invoice sent to a retailer. In other words, the invoice reflects the price discount. Node 624 also includes condition information reflecting a $4.80 discount per case, off-invoice, while node 626 includes condition information reflecting a $3.60 discount per case, off-invoice. Node 628, on the other hand, includes condition information reflecting a $3.60 discount per case, where the discount is to be billed back. A bill back discount is a discount where the invoice to the retailer reflects the normal price, and the retailer later sends the manufacturer a bill for money owed on the discount.

Trade Calendar

As noted above with reference to FIG. 3, trade calendar module 314 facilitates generation and operation of a trade calendar, a user interface, central entry point, and working area for an account manager with an overview of all promotional events within a certain time range. The trade calendar also allows the account manager to create new promotions or campaigns by creating a bar directly in the appropriate time range, and to reschedule any planned activities by moving or stretching this bar. The calendar also enables the account manager to delete the activity or copy it elsewhere.

Figure 7:
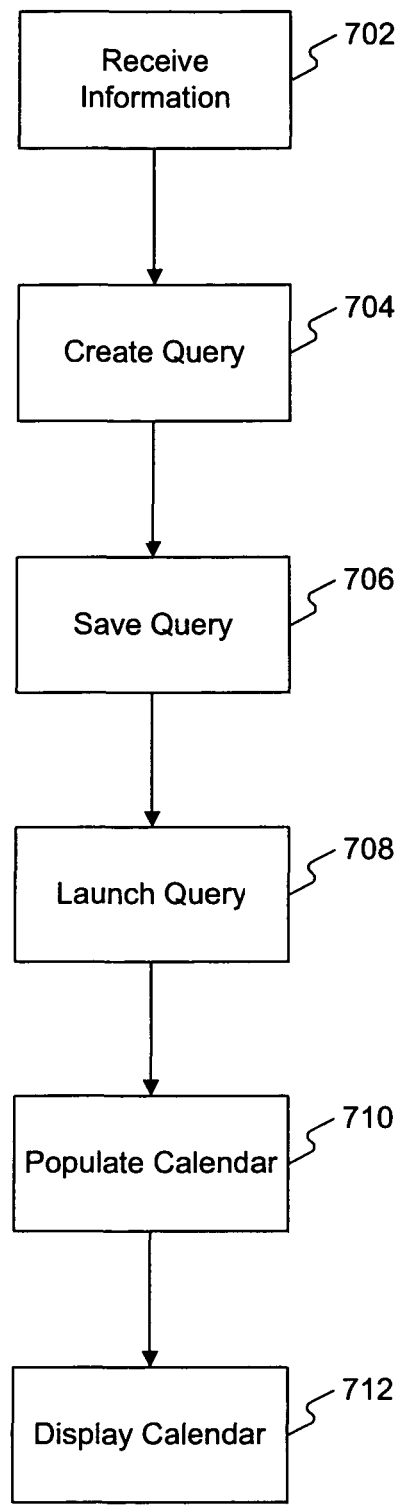
FIG. 7 shows an exemplary flowchart of a method for providing a trade calendar, consistent with the principals of the present invention.

The calendar further allows a user to look at projects from several perspectives; for example, by brand, retailer, or product group (e.g., promotable group). To do this, it is necessary for a user, such as an account manager, to create or select a query defining how the calendar should be populated and displayed. FIG. 7 is a diagram of an exemplary flowchart of a method for providing a trade calendar consistent with the present invention. Although the steps of the flowchart are described in a particular order, one skilled in the art will appreciate that these steps may be performed in a modified or different order. Further, one or more of the steps in FIG. 7 may be performed concurrently or in parallel.

Trade calendar module 314 may first receive information to be used in populating the trade calendar (step 702). For example, trade calendar module 314 may receive deal information from deal master module 312 (step 702). More particularly, there may be a trade calendar module 314 resident on a mobile client 204 in addition to the trade calendar module 314 resident on CRM server 202. A trade calendar may be used by an account manager or other user accessing either a mobile client 204 or CRM server 202. When the account manager utilizes mobile client 204, trade calendar module 314 may receive the deal information, for example, when the mobile client 204 is synchronized with CRM server 202. If the account manager utilizes CRM server 202 to access trade calendar functionality, then the deal information may be available for use as soon as the status associated with the deal information indicates that the deal information is ready. Other exemplary information that may be used to populate the trade calendar may include marketing activity information (e.g., media campaigns, TV, radio, or cinema advertising, etc.) or trade promotion information.

Once the information has been received by trade calendar module 314, the account manager or other user may proceed to create a query that defines how the calendar will be populated (step 704). One of ordinary skill in the art will appreciate that a previously defined query may be selected instead of having a new one created. In the context of deals, a query is a filter that selects all deals which are consistent with the entered search criteria. Instead of deals, trade calendar module 314 may use marketing activities (e.g., media campaigns, TV, radio, or cinema advertising, etc.) or trade promotions as the basis for a query. When creating a new query, the account manager or other user may enter information selecting the type of object (e.g., deal, trade promotion, or marketing activity), as well as the details defining the search criteria. Exemplary search criteria may include, for example, promotable group, retailer, planning year, product, product category, promotion type, promotion objective, person responsible, etc. For example, if a user selects Kroger/Nashville, all deals/promotions attending to business with Kroger/Nashville can be brought to the attention of the user making the request. Or a trade marketing manager responsible for product X can select that product from the listings and have all information displayed for that product for review and action.

Once a query has been created, the user may save the query (step 706). In a situation where the user selected a previously existing query, it is not necessary to save the query, unless the existing query is edited. The user may then cause trade calendar module 314 to launch the query (step 708). In an alternative embodiment, trade calendar module 314 may launch a new query without first saving it. After the query has been launched, trade calendar module 314 then finds the information that meets the requirements of the query and populates the trade calendar (step 710). Thereafter, trade calendar module 314 may display the trade calendar (step 712). Dependent on whether the query is related to a deal, trade promotion, or marketing activity, the calendar will display each deal, trade promotion, or marketing activity, respectively, that meets the requirements of the query. Another factor that may affect how the trade calendar is displayed is time. For example, the user may select the time period that should be used in displaying the trade calendar. In this manner, the deal, trade promotion, or marketing activity may be displayed in daily, weekly, or monthly terms. One of ordinary skill in the art will appreciate that alternative time periods may be selected by the user. In an alternative embodiment, the user may choose a list view instead of a calendar view. If a list view is chosen, then projects (e.g., deals, trade promotions, or marketing activities) are displayed in list form, instead of as part of a calendar.

Exemplary benefits of the list view includes the following:

While the graphical representation of the calendar (as in FIG. 9A) focuses on the timing of promotional activities (e.g., when executed/for how long), the list view may present a larger set of attributes of those deals/promotions/marketing activities loaded by means of a query (attributes being, e.g., promotion ID, description, promotion type, objective, tactics, priority, status, planning profile group, person responsible, etc.) in a table-like display.

The list view allows for mass changing to all loaded objects/a subset of all loaded objects. To execute mass changes, a user may execute a query, thereby loading multiple objects (e.g. promotions) to the trade calendar, then navigate to the list view, mark those objects which should be changed, select the attribute that needs to be changed (e.g. status) and specify the new value to be given to this attribute (e.g. status="released"). The list view may then execute the same change to all objects that have been previously marked. This mass change functionality could be used, for example, to release a complete annual promotional plan of an account manager, to copy a previous year's annual plan (comprising, for example, of all promotions that this account manager planned and executed for one customer/customer group within that year) to the current year (e.g., this provides an easy way to copy a previous year's plan to the current year's plan), etc.

Figure 8:
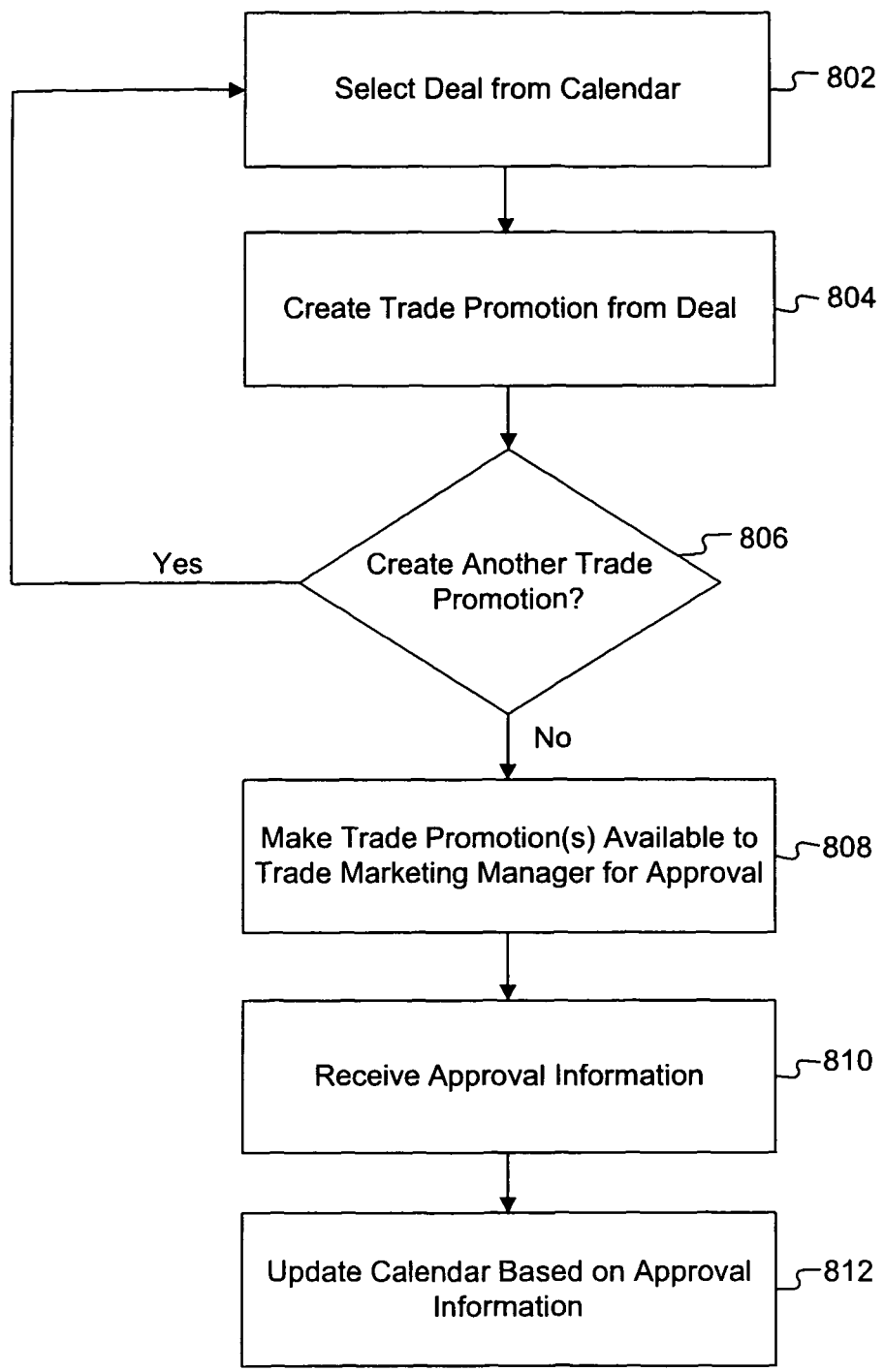
FIG. 8 shows an exemplary flowchart of a method for creating a trade promotion from a deal using a trade calendar, consistent with the principals of the present invention.

Once the trade calendar is displayed, a user may access or edit an item on the calendar. For example, when the trade calendar displays various deals, a user may click or otherwise select an area of the display corresponding to a particular deal, and proceed to perform different functions. In the case of deals, the user only has the option of creating a trade promotion from the selected deal. FIG. 8 is a diagram of an exemplary flowchart of a method for creating a trade promotion from a deal using a trade calendar consistent with the present invention. Although the steps of the flowchart are described in a particular order, one skilled in the art will appreciate that these steps may be performed in a modified or different order. Further, one or more of the steps in FIG. 8 may be performed concurrently or in parallel.

An account manager or other user first selects a deal from the displayed trade calendar (step 802). For example, the user may click or otherwise select an area of the display corresponding to a particular deal. In one embodiment, this area of the display may be a bar whose size reflects the time period for which the deal is effective. When the user clicks on the bar, trade calendar module 314 may present the user with a new screen to view the deal in detail, referred to herein as a marketing planner screen. The user thereafter may enter information corresponding to a trade promotion on the marketing planner screen, in order to generate a trade promotion from the displayed deal.

Generally, a deal is a template for creating a trade promotion (e.g., a trade promotion is based on the information entered for a deal). Accordingly, when the user is presented with the marketing planner screen, several parameters associated with the trade promotion are initially set to the same values as for similar parameters in the deal. For example, the promotable group, sales area, and time period associated with the deal is assigned to the trade promotion. Other values (if present) from the deal may also be assigned to the trade promotion, such as condition information, promotion type/objectives/tactics, priority, authorization groups, person responsible, currency, buying pattern type, etc. If the deal does not include extra information such as condition information, promotion type/objectives/tactics, priority, authorization groups, person responsible, currency, and buying pattern type, then the user creating the trade promotion may enter this information. Additionally, the user may enter planning profile group information and action profile information.

Planning profile group may define a set of parameters for key figure planning. Examples of key figures may include baseline sales volume, incremental volume, amount for lump-sum payment, discount given for a product/promotable group, etc.

An action may refer to a pre-defined system activity that may be launched automatically as soon as a predefined triggering condition is reached. For example, a notification may be sent to the person responsible two weeks prior to the planned start date of a promotion. An action profile is a collection of actions.

The user also may prepare a volume forecast. A volume forecast in this context refers to an estimate of the volume of business that will result due to the trade promotion (for example, a number of cases sold during a promotion buy period). In one embodiment, a volume forecast may hold the numbers on the expected sales volume (in units of promoted products) on executing a promotion. Typically, the system distinguishes between baseline sales volume (which is the expected sales volume in the absence of promotional activities) and uplift sales volume (which is the incremental volume arising from the promotional activity). The volume forecast is important because it helps determine whether the promotion has a good chance of hitting a volume target, and it helps the user stay within a budget.

Once the user has entered all required information, the trade promotion is created from the deal (step 804). For example, the user may indicate that the trade promotion is complete, and in response trade calendar module 314 may save the information associated with the trade promotion. In saving the information, trade calendar module 314 may create a trade promotion object. The trade promotion object may include the aforementioned information associated with the trade promotion except for condition information, which is maintained in a separate data structure called a promotion condition record. One of ordinary skill in the art will appreciate that a module other than trade planner module 314 may save the information associated with the trade promotion.

The user may then return to the trade calendar, where the user may decide whether another trade promotion should be created (step 806). If so, then processing returns to step 802 and the user selects another deal from which to create a trade promotion.

If not, then any created trade promotions are made available to the trade marketing manager for approval (step 808). For example, the user that created the trade promotion may change the status of the trade promotion to a status reflecting that the promotion should be sent or otherwise made available to the trade marketing manager. If the trade promotion, for example, was created using a trade calendar module 314 resident on a mobile client 204, then the trade promotion may be uploaded to CRM server 202. If the trade promotion was created using a trade calendar module 314 resident on CRM server 204, then the trade promotion may be immediately available for use by a trade marketing manager. In either case, the next time the trade marketing manager searches for trade promotions that need approval, the trade promotions that were recently created may be presented.

The trade marketing manager may then either accept or reject the trade promotion(s). One of ordinary skill in the art will appreciate that if there are multiple trade promotions to accept or reject, the trade marketing manager may accept some and reject some, reject all, or accept all. The trade marketing manager may indicate that a given trade promotion has been accepted or rejected by changing the status of the trade promotion to either an accepted status or a rejected status. Once the trade marketing manager has chosen one way or the other whether a trade promotion is accepted, approval information may be sent to trade calendar module 314 (regardless of whether the information is sent to a mobile client 204 or stays at CRM server 202). Approval information in this context refers to information reflective of whether a trade promotion has been accepted or rejected.

The approval information may thereafter be received by trade calendar module 314 (step 810). In the case of mobile client 204, the approval information may be received whenever the mobile client 204 and CRM server 202 next synchronize. Thereafter, trade calendar module 314 may update the trade calendar based on the approval information (step 812). For example, the next time one of the trade promotions previously sent for approval is displayed as part of the trade calendar, the trade promotion may include information indicating whether the promotion has been accepted or rejected. In one embodiment, the trade promotion may be color coded based on whether the promotion has been accepted or rejected. For example, an approved trade promotion may be green, and a rejected promotion may be red. One of ordinary skill in the art will appreciate that alternative color coding may be used, or that alternative methods of informing a user of whether the promotion has been accepted may be used.

Figure 9A:
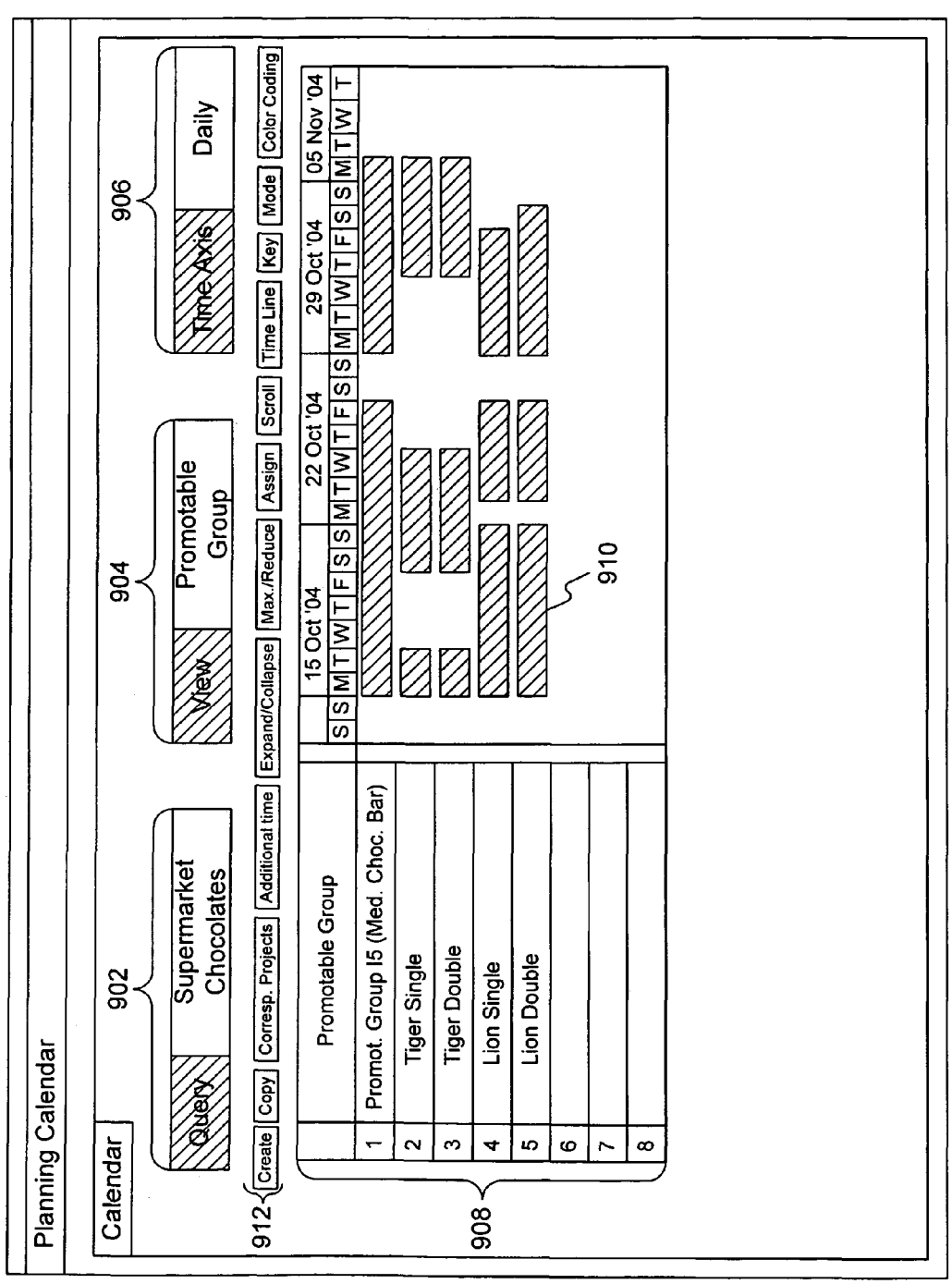
FIG. 9A shows a display of an exemplary trade calendar consistent with the principals of the present invention.

FIG. 9A shows an exemplary trade calendar 900 consistent with one implementation of the present invention. The trade calendar of FIG. 9A shows a number of trade promotions. Each trade promotion has a time bar 910 associated with it. A user may extend or shorten the length of a trade promotion be extending or shortening the time bar 910. The user may also click or otherwise select a time bar 910 associated with a trade promotion in order to further edit the parameters associated with the trade promotion. The time bar 910 may be color coded to indicate, for example, whether or not the trade promotion associated with the time bar has been accepted or rejected. The time bar 910 may also include textual information. When referring to deals or trade promotions, the time marked by a time bar 910 may reflect buy dates, order dates, shipping dates, or performance date (performance refers to the retailer doing whatever the retailer has agreed to do).

Area 902 identifies the current query of the trade calendar (e.g., the query that was used to create the calendar). In FIG. 9A, the current query is entitled "Supermarket Chocolates," which may be a user-supplied name or automatically generated. Area 902, for example, may be a pull-down menu that enables a user to select a query. Area 902 may also enable the user to create a new query. For example, one selection in the pull-down menu may be a selection indicating that a new query is to be created. One of ordinary skill in the art will appreciate that alternative ways of selecting a query and creating a query may be used.

Area 904 allows a user to choose the visualization/view. The view, for example, influences the way that data loaded by means of a query is presented to the user. In the example shown in FIG. 9A, the view dictates that the left column of screen area 908 shows the heading "Promotable Group" and products in a hierarchical tree (visualized by the indentation on product level). Other views may instead show, for example, the promotion ID, the brand hierarchy, or the product hierarchy in the first column.

In FIG. 9A, the user has chosen to view by "Promotable Group. This selection is evident in area 908, which shows the general heading of "Promotable Group" as the promotable group to be viewed. Area 908 generally lists several items, each of which have multiple time bars 910 associated with them. Each of the listed items represents either a promotable group or a particular product within the promotable group. For example, item 1, "Promotable Group 15 (Medium Chocolate Bars)" may be a small promotable group, Items 2-5 may be specific products that are part of "Promotable Group 15."

Area 906 permits the user to determine the setting for the time axis to be displayed with the trade calendar. For example, in FIG. 9A, the user has chosen to display the time periods in a "Daily" format. As such, the trade calendar includes a time axis with representations of the days of the week. The time bars 910 are sized so that by looking at the time bars 910, the user can ascertain the length of a trade promotion in number of days, and can further ascertain which specific days the trade promotion is to run. One of ordinary skill in the art will appreciate that other time axis information may be used, such as weekly, bi-weekly, monthly, etc. In one embodiment, the user may also choose whether displayed dates are fixed dates, relative dates, or automatic dates. Fixed dates means the displayed dates have an earliest and latest date that have been specifically provided by the user. Relative dates means displayed dates are relative to today's date. Automatic dates means that the trade calendar automatically adapts to the current query and shows the earliest and latest dates for the projects contained in the query.

Trade calendar 900 also includes a number of buttons 912, which may be used to implement various features of trade calendar 900. For example, the "create" button may be used by the user to add new projects to trade calendar 900. In the context of FIG. 9A, a project refers to a trade promotion. However, if a trade calendar is displaying deals or marketing activities instead of trade promotions, then the create button may be used to create new deals (as long as the user has proper authorization and is not using a mobile client 204) or marketing activities. The user may alternatively draw a new time bar 910 in the trade calendar to create a new project. Once the create button is selected or new time bar 910 is drawn, the user is directed to the marketing planner screen used to enter details for the trade promotion (explained above with reference to FIG. 8), where the user may then enter the details. In the case that a new time bar 910 was drawn to create the project, the time period values associated with the project may already be entered when the user is directed to the aforementioned marketing planner screen.

The "copy" button may be used by the user to copy an already existing project. For example, the user may select an existing trade promotion and click on the copy button. Trade calendar software 314 may then direct the user to a marketing planner screen. In this instance, all of the data for the existing trade promotion is copied to the marketing planner screen as well, except for status information and actual dates. Similar functionality allows a user to copy a whole year into the next year.

The "corresponding projects" button enables a user to display all marketing activities related to a trade promotion or vice versa, or all trade promotions related to a deal or vice versa. Corresponding projects may be viewed in a split screen. The related projects may only be displayed; they cannot be modified. In order to be able to display related projects, the same products need to be assigned to both projects.

The "additional time" button enables a user to display additional date ranges alongside the actual time period for the project. An exemplary additional date range is a buying period. An additional date range, for example, may be displayed as an additional line associated with a time bar 910. The additional date range may also be automatically updated based on changes to the project. For example, if a buying period (e.g., additional date range) is set to start one week before a trade promotion, any changes in the trade calendar will automatically take this into account and if the promotion is changed, the date when buying starts is automatically reset.

The "expand/collapse" button enables a user to expand or collapse a hierarchy that is being displayed. The "maximize/reduce button" enables a user to magnify a displayed hierarchy so that the user can look at something in more detail, or reduce the size so the user can get an overview of the whole hierarchy. These hierarchies are primarily retailer, geography and/or product related structures. For example, New York City is part of the New York market, which is part of the Northeast Region, which is part of the US Total, which is part of the Global company. Similarly, retailer and product follow a similar type structure so that the planners, distributors, executors, and analyzers of the business can view the information at the level of the hierarchy that is most appropriate for their decision making responsibilities. In FIG. 9A, hierarchy is the promotable group->product hierarchy. With the cursor positioned on line 1, function "collapse," for example, would result in only this single line being displayed; all the lines related to products subordinated to promotable group "Promotable Group 15" would be hidden/collapsed. Function "example" may cause these lines to re-appear.

The "assign" button enables a user to establish a hard link between two projects. For example, after a user has selected the "corresponding projects" button so that a corresponding project is displayed in the trade calendar, the user may choose to establish a hard link between the corresponding projects. A soft link is a loose association between entries of corresponding projects. Activity with respect to an entry in one project might trigger an alert or other action with respect to the corresponding entry in the corresponding project, but does not necessarily do so. A hard link, on the other hand, is a more concrete link between entries of corresponding projects, where activity with respect to an entry on one project definitively triggers an alert or other action with respect to the corresponding entry in the corresponding project.

The "scroll" button enables a user to scroll before and after a project without changing the fixed dates. The "time line" button enables a user to set the timescale that is displayed in the trade calendar. For example, the total time line of the trade calendar (as set using the "time line" button) might exceed the visual time axis. In this case, a horizontal scroll bar may be presented at the bottom of screen area 908 to navigate through the total time line.

The "key" button enables a user to see the settings that have been made by the user and what those settings represent. Settings may refer to the parameters associated with the displayed projects. The "mode" button enables a user to toggle back and forth between a mode in which the user can change the size of a time bar 910 and a mode in which the user can just move the whole bar.

The "color coding" button enables a user to decide how colors are assigned for a status or project type (or whether colors are assigned at all). For example, as noted above with reference to FIG. 8, different colors may be assigned to a trade promotion dependent on whether the promotion has been approved or rejected by a trade marketing manager. It may also be possible to assign different shapes to show the difference between different types of projects.

Figure 9B:
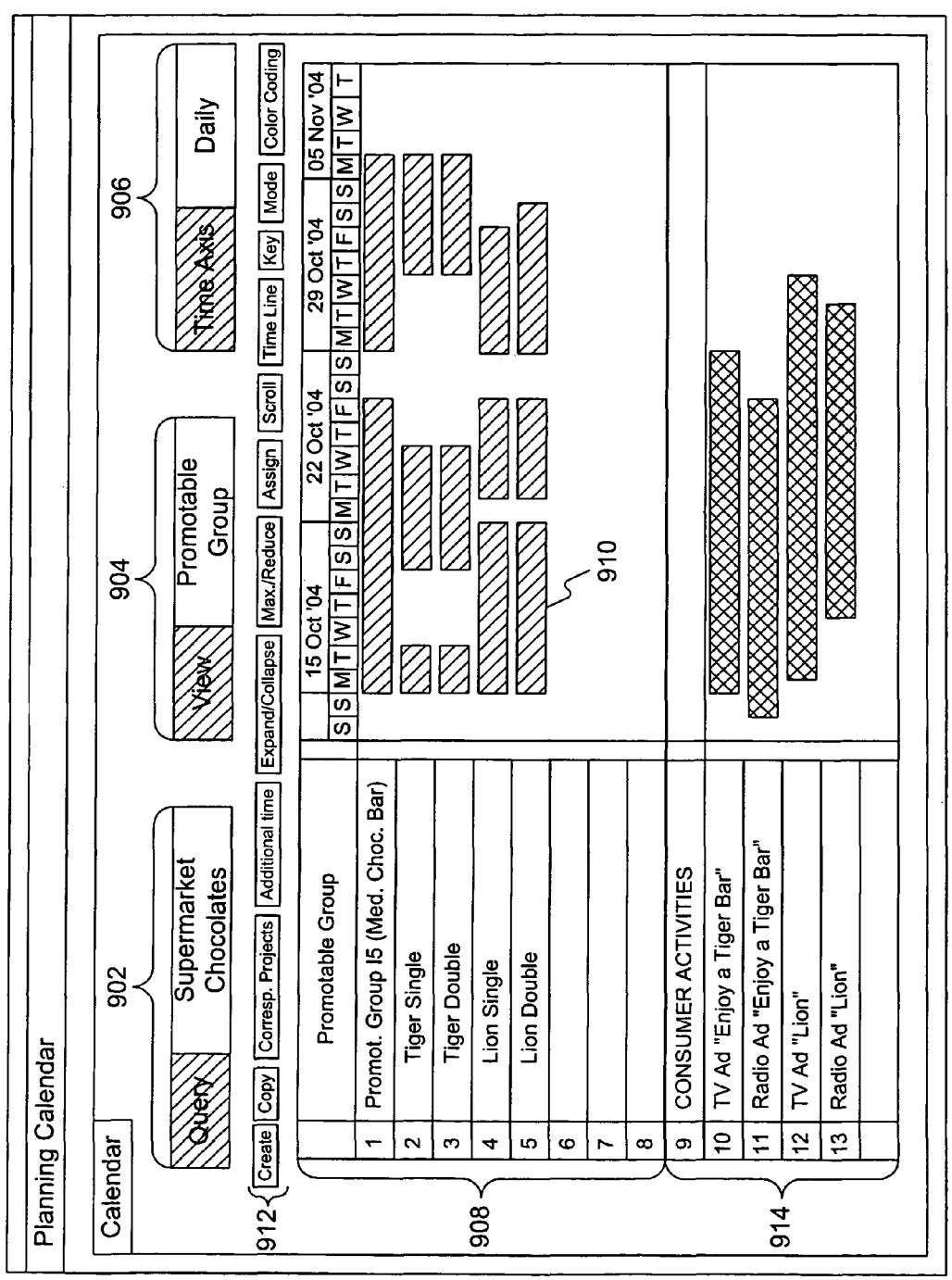
FIG. 9B shows another display of an exemplary trade calendar consistent with the principals of the present invention.

FIG. 9B shows another view of trade calendar 900 consistent with one implementation of the present invention. More particularly, trade calendar 900 of FIG. 9B is the same calendar depicted in FIG. 9A except in FIG. 9B, the user has selected the "corresponding projects" button. As noted above with respect to FIG. 9A, the "corresponding projects" button enables a user to display all marketing activities related to a trade promotion or vice versa, or all trade promotions related to a deal or vice versa. Corresponding projects may be viewed in a split screen. In FIG. 9B, by selecting the "corresponding projects" button, the user caused marketing activities that correspond to the displayed trade promotions to be displayed. These marketing activities are show in area 914. The related marketing activities of area 914 may only be displayed; they cannot be modified, though further details on the activities may be displayed by clicking on one of the time bars 910 associated with the corresponding activities.

Integrated Promotion Planning

Figure 10:
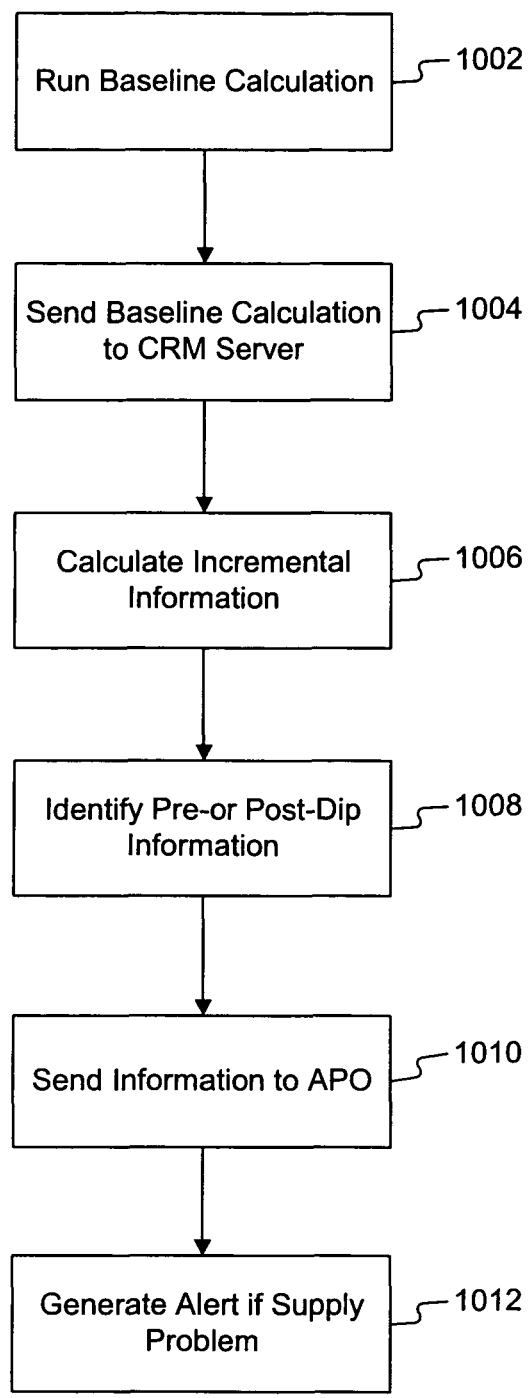
FIG. 10 shows an exemplary flowchart of a method for performing integrated promotion planning, consistent with the principals of the present invention.

As noted above with reference to FIG. 3, integrated promotion planning module 316 may be operable to receive demand planning data and promotion planning data, and perform tasks such as determining the impact of promotion on baseline demand and generating an adjusted forecast in view of promotion. FIG. 10 shows an exemplary flowchart of a method for performing integrated promotion planning in a manner consistent with the present invention. Although the steps of the flowchart are described in a particular order, one skilled in the art will appreciate that these steps may be performed in a modified or different order. Further, one or more of the steps in FIG. 10 may be performed concurrently or in parallel.

First, APO server 208 runs a baseline calculation of demand for a particular product or products over a pre-determined time period (step 1002). For example, APO server 208 may estimate how many items with a particular stock keeping unit (SKU) number will be purchased by consumers from a specific retailer on a weekly basis for the next eight weeks. One of ordinary skill in the art will appreciate that the baseline demand calculation may be performed for alternative time periods. The baseline calculation may be calculated automatically by APO server 208, based on historical data for similar products and time periods. Alternatively, the baseline calculation may be calculated manually by a user of APO server 208. A combination of automatic and manual calculations may also be used.

Once the baseline calculation has been completed, APO server 208 may send the calculation to CRM server 202 (step 1004). This sending may be automatically performed at periodic intervals, or may be performed based on a request from a user of APO server 208 or CRM server 202. The baseline calculation, for example, may populate a chart on a screen that may be used by a user, such as an account manager, to help the user plan a trade promotion. In this manner, the user may be able to more easily take the baseline information into consideration during planning.

Thereafter, the user, in conjunction with CRM server 202, may calculate incremental information associated with the baseline calculation in view of a promotion being planned by the account manager (step 1006). Incremental information refers to how many more items will be sold by the retailer due to the promotion. The calculation of the incremental information may be calculated automatically by CRM server 202, based on historical data for similar promotions. Alternatively, the incremental information may be calculated manually by a user of CRM server 202. A combination of automatic and manual calculations may also be used. Instead of calculating the incremental (e.g., how many more items will be sold), the total could instead be calculated. Then, based on the total and the baseline calculation, the incremental information may be determined. Total refers to the total items that will be sold in view of the promotion (e.g., baseline+incremental). Incremental information may be automatically or manually entered onto the chart that was populated by the baseline information.

The account manager or other user may also identify any pre-dip or post-dip associated with the promotion being planned (step 1008). Pre-dip refers to a decrease in demand that occurs just prior to a promotion. For example, consumers may not purchase as many items immediately before a promotion for a number of reasons, not the least of which is that consumers may be willing to wait until the promotion to purchase an item. Post-dip, on the other hand, refers to a decrease in demand that occurs just after a promotion. The calculation of the pre- or post-dip information may be calculated automatically by CRM server 202, based on historical data for similar promotions. Alternatively, the pre- or post-dip information may be calculated manually by a user of CRM server 202. A combination of automatic and manual calculations may also be used. Pre- and post-dip information may also be automatically or manually entered onto the chart that was populated by the baseline information.

Once all incremental information and pre- and post-dip information has been calculated, CRM server 202 may send all of this information to APO server 208 (step 1010). The next time a user of APO server 208 accesses an appropriate screen (e.g., a screen that previously displayed the baseline calculation), a full forecast, including baseline calculations, incremental information, and pre- and post-dip information may be displayed. APO server 208 may also monitor this full forecast to determine whether or not there are any potential supply problems. If APO server 208 determines that the forecasted demand (including baseline calculations, incremental information, and pre- and post-dip information) exceeds supply, APO server 208 may generate an alert (step 1012). A suitable user may then take appropriate action based on the alert.

Integrated Market Account Planning for Promotions

Figure 11:
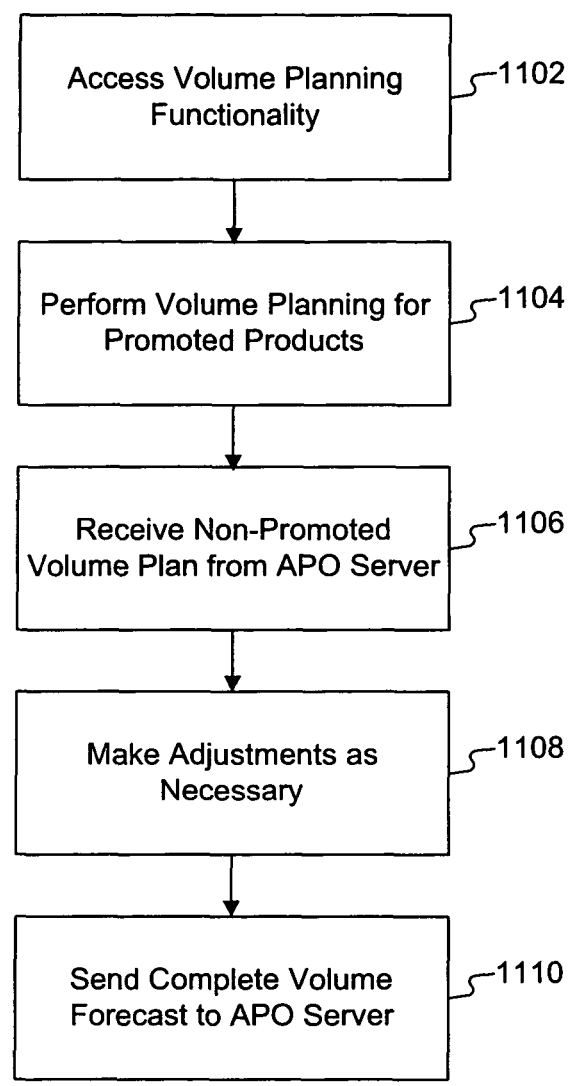
FIG. 11 shows an exemplary flowchart of a method for performing integrated market account planning, consistent with the principals of the present invention.

As noted above with reference to FIG. 3, integrated market account planning module 318 may be operable to allow an account manager to gain an understanding of the impact of volume and spending on profitability, as well as ensure that a complete volume forecast from a retailer perspective is delivered to the supply chain team. FIG. 11 shows an exemplary flowchart of a method for performing integrated market account planning in a manner consistent with the present invention. Although the steps of the flowchart are described in a particular order, one skilled in the art will appreciate that these steps may be performed in a modified or different order. Further, one or more of the steps in FIG. 11 may be performed concurrently or in parallel.

A user, such as an account manager, may first access volume planning functionality (step 1102). For example, for an account manager to completely plan a trade promotion, the account manager must forecast the volume that will coincide with the promotion. Volume for a particular product and retailer refers to how much of the product will be sold to the retailer. Volume, for example, may be expressed in terms of number of cases (e.g., there may be x items in a case), number of individual items, tonnage, etc. In one embodiment, a user may access a screen suitable for volume planning from a trade calendar.

The user may next perform promoted volume planning (step 1104). In other words, the user may estimate the required volume for one or more products in the time period(s) during which the one or more products are to be promoted. The user, for example, may enter promoted volume planning information on a suitable screen that may include, for example, a chart corresponding to the promoted product(s) with spaces for entering both promoted volume information and non-promoted volume information. The calculation of the promoted volume may be calculated automatically by CRM server 202, based on historical data for similar promotions. Alternatively, the promoted volume may be calculated manually by a user of CRM server 202. A combination of automatic and manual calculations may also be used.

CRM server 202 may also receive, at the request of the user, non-promoted volume information from APO server 208 and/or business warehouse 210 (step 1106). Non-promoted volume information refers to the estimated volume for one or more products during time periods in which there is no promotion for the products. CRM server 202 may populate the chart being used by the user to enter promoted volume information, with the received non-promoted volume information. In this manner, the user more easily can take non-promoted volume estimates into consideration when determining a volume plan.

Thereafter, adjustments to the promoted and/or non-promoted volume information may be made as necessary (step 1108). For example, the user may decide that the promoted volume information is inaccurate based on the received non-promoted volume information and decide that the promoted volume information should be changed. The user may also decide that the non-promoted volume information needs to be changed in view of the promoted volume information. The user may make these determinations manually or with the help of CRM server 202, based on historical data.

CRM server 202 may then send the complete volume forecast to APO server 208 and/or business warehouse 210. The complete volume forecast is a volume forecast that includes both a promoted volume aspect and a non-promoted volume aspect. APO server 208 is thus provided with a volume forecast that was created by a single system taking both promoted and non-promoted planning into consideration. This cuts down on problems of coordination and control.

Financial Controls of Promotional Activities

Figure 12:
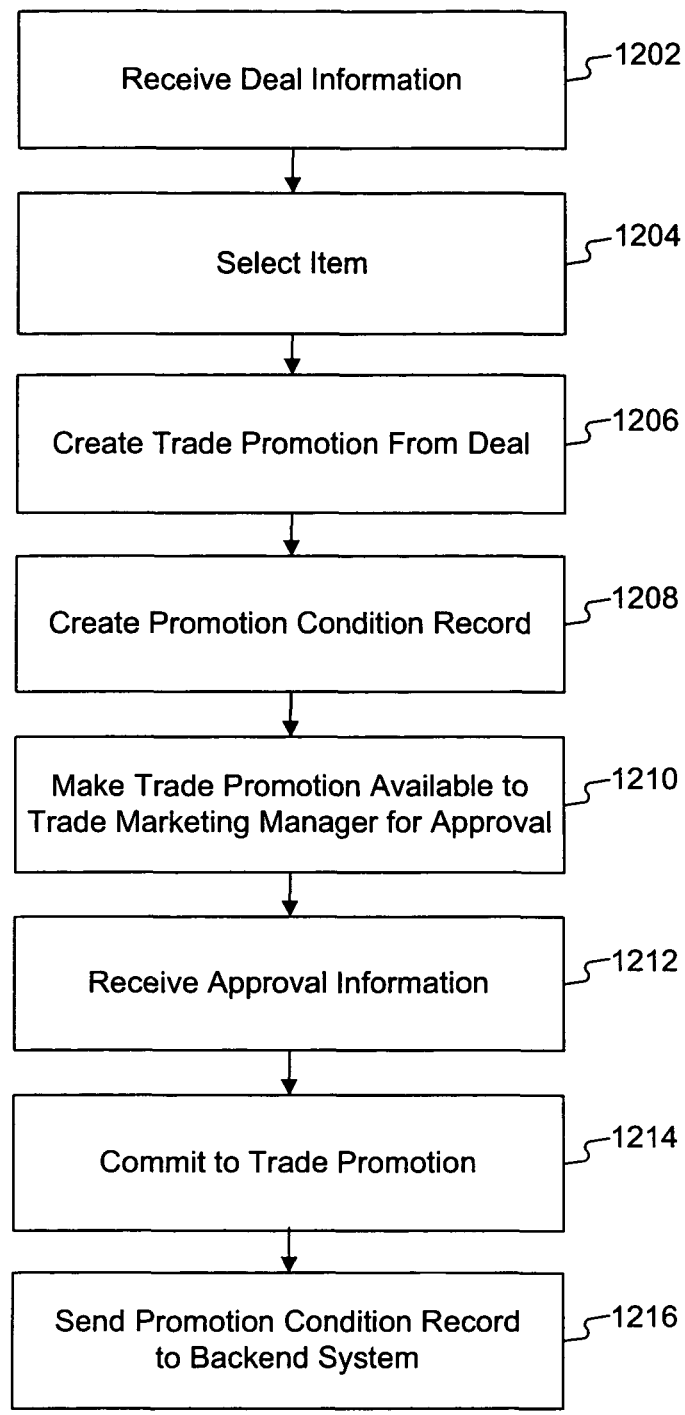
FIG. 12 shows an exemplary flowchart of a method for integrating promotion planning with promotion execution, in a manner consistent with the present invention.

As noted above with reference to FIG. 3, financial controls module 320 meshes promotion planning with execution and reporting, thereby integrating all relevant components in one process. FIG. 12 shows an exemplary flowchart of a method for integrating promotion planning with promotion execution in a manner consistent with the present invention. Although the steps of the flowchart are described in a particular order, one skilled in the art will appreciate that these steps may be performed in a modified or different order. Further, one or more of the steps in FIG. 12 may be performed concurrently or in parallel.

Trade calendar module 314 may receive deal information from deal master module 312 (step 1202). This step is similar to step 702 from FIG. 7. Also similar to FIG. 7, a user, such as an account manager, may create a new query or select a preexisting query. After the query has been saved and launched, a trade calendar may be populated and displayed. The user may then select an item corresponding to a deal from the calendar (or from a list if a list view is chosen) (step 1204). This step is similar to step 802 from FIG. 8. The user is then presented with a new screen for entering trade promotion information.

Accordingly, the user may enter information defining the parameters of the trade promotion (see e.g., steps 802-804 of FIG. 8). This information may include condition information to be used in creating conditions to be associated with the trade promotion. In order to associate conditions with a trade promotion, the user needs to enter various information defining the conditions. Exemplary information defining the conditions may include, for example, promotion type, payment type, discount amount, related volume, discount method, etc.

The user may also choose to prepare a volume forecast. Once the user has entered all required information, the trade promotion may be created from the deal (step 1206). More particularly, a trade promotion object may be created. The trade promotion object may include the aforementioned information associated with the trade promotion except for condition information.

The condition information pertaining to the trade promotion may be used to create a promotion condition record (step 1208). For example, trade calendar module 314 or financial controls module 320 may create a promotion condition record upon detecting that a user has entered and saved condition information pertaining to the trade promotion, or the user otherwise requests that a condition be generated. The promotion condition record may include, for example, information detailing the condition, such as promotion type, payment type, discount amount, etc. The promotion condition record may also include a trade promotion object ID. The trade promotion object ID may identify the trade promotion object that corresponds to the trade promotion associated with the condition. In this manner, a promotion condition record is linked to a particular promotion object. The corresponding trade promotion object, however, does not include a link to its corresponding promotion condition record(s).

In the meantime, similar to steps 808 and 810 from FIG. 8, in steps 1210 and 1212, the created trade promotion is made available to the trade marketing manager for approval. The trade marketing manager in turn may approve or reject of the trade promotion, and the approval information may be received by trade calendar module 314. If a particular trade promotion has been approved, the user may opt to accept the approval. The user may then approach the retailer with the trade promotion. If the retailer agrees to the trade promotion, then the user may change the status associated with the trade promotion to a committed status (step 1214). Once the trade promotion has been committed to, financial controls module 320 may send the promotion condition record corresponding to the promotion to backend system 206 (step 1216).

Figure 13:
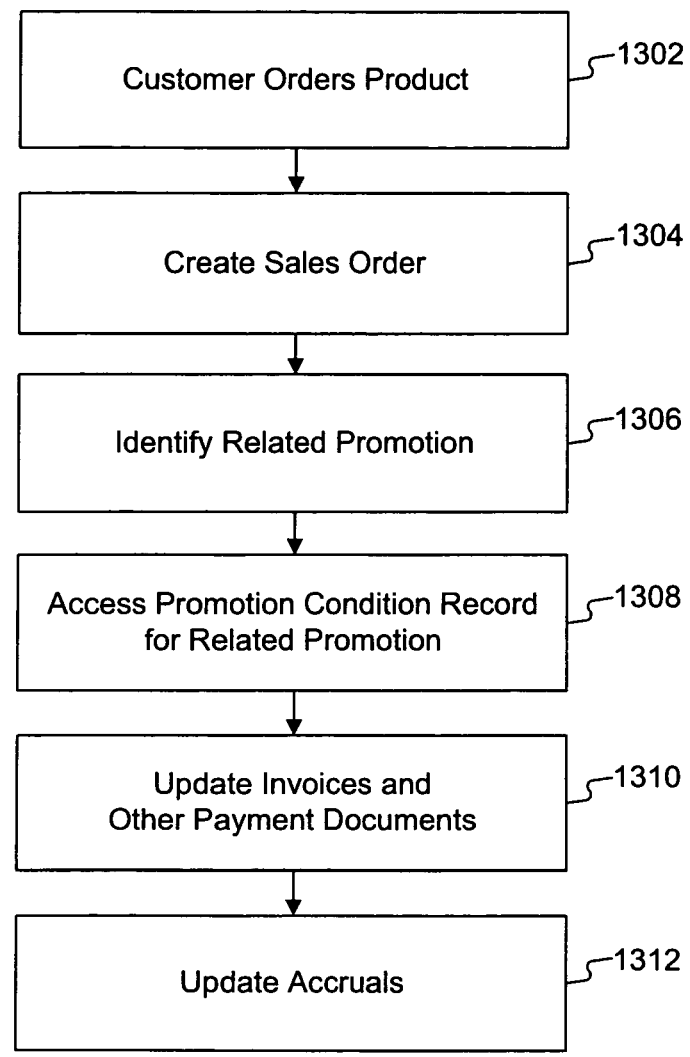
FIG. 13 shows an exemplary flowchart of a method for tracking trade promotion conditions, in a manner consistent with the present invention.

Having received the converted conditions, backend system 206 has the ability to keep track of trade promotion conditions so that liabilities to retailers may be immediately considered and acted upon. As such, retailers do not have to wait as long to see what liabilities they are owed, decreasing the number of reactions such as making "short payments" on current invoices, for example. FIG. 13 shows an exemplary flowchart of a method for tracking trade promotion conditions in a manner consistent with the present invention. Although the steps of the flowchart are described in a particular order, one skilled in the art will appreciate that these steps may be performed in a modified or different order. Further, one or more of the steps in FIG. 13 may be performed concurrently or in parallel.

A customer (e.g., a retailer) may order a certain quantity of a product from a manufacturer (step 1302). In response, backend system 206 creates a sales order for the product (step 1304). For example, backend system 206 may receive input from the retailer indicating that the retailer wishes to order 100 cases of tonic water. In response, backend system 206 may save the input as sales order information. Associated with the sales order information may be an identification of the retailer placing the order (e.g., retailer ID) and date information. Date information may include, for example, a date on which the sales order was placed by the retailer, a date on which the products are to be shipped, and/or a date on which the products are actually purchased.

Based on the product, retailer, and time period, backend system 206 may determine whether there is a related trade promotion. If so, backend system 206 may identify that trade promotion (step 1306). For example, backend system 206 may search promotion condition records maintained by backend system 206 for records that correspond to related trade promotions. Alternatively, backend system 206 may search trade promotion objects maintained by CRM server 202 or backend system 206 for related trade promotions. In this case, once a relevant trade promotion object is found, backend system 206 may then search for promotion condition records with a trade promotion object ID corresponding to the relevant trade promotion object.

Regardless of whether backend system 206 first searches promotion condition records or trade promotion objects, upon finding a related trade promotion, backend system 206 may access the promotion condition record for the related promotion (step 1308).

Accordingly, by accessing the promotion condition record, backend system 206 identifies the particular conditions for the trade promotion related to the sales order. Backend system 206 may use this condition information to update invoices and/or other payment documents (e.g., credit or debt memos) related to the sales order (step 1310). For example, backend system 206 may alter an invoice or other payment document to be sent to a particular retailer when it determines that the retailer has ordered a product subject to a trade promotion at the time of ordering. The altered invoice or other payment document may reflect, for example, a discount to be awarded the retailer for agreeing to the trade promotion. In one embodiment, the altered invoice may also include a reference to the related trade promotion object.

In addition to updating invoices and/or other payment documents, backend system 206 may also update accruals that correspond to rebate agreements associated with the retailer (step 1312). A rebate may be a payment provided to a retailer, triggered by the retailer reaching a predetermined sales volume and/or revenue within a fixed time period. Payment may be deducted from an invoice or separately provided to retailer. An accrual may refer to an accumulation of volume and/or cost figures related to a rebate agreement associated with the retailer. For example, a rebate agreement associated with the retailer may indicate that the retailer is to receive a rebate from the manufacturer once the retailer has purchased a certain volume of a particular product, or the retailer has paid a certain amount of money for the particular product. In one embodiment, such a rebate agreement may be a type of trade promotion. As such, a promotion condition record associated with the rebate agreement may exist, where the promotion condition record would indicate the size of the rebate.

Alternatively, rebate agreements may be separate from promotion condition records, and may have other records, known as rebate agreement records, associated with them. Similar to promotion condition records, rebate agreement records may be created by CRM server 202 and transferred to backend server 206. Regardless of whether backend server 206 learns about rebates by accessing promotion condition records or rebate agreement records, backend server 206 may keep track of the volume and/or cost totals in the accruals. Because backend server 206 knows about the trade promotion (e.g., rebate in this case) related to the retailer, when an accrual for a particular retailer reaches the appropriate level, backend server 206 may automatically apply the rebate.

While the present invention has been described in connection with various embodiments, many modifications will be readily apparent to those skilled in the art. One skilled in the art will also appreciate that all or part of the systems and methods consistent with the present invention may be stored on or read from computer-readable media, such as secondary storage devices, like hard disks, floppy disks, and CD-ROM; a carrier wave received from a network such as the Internet; or other forms of ROM or RAM. Accordingly, embodiments of the invention are not limited to the above described embodiments and examples, but instead is defined by the appended claims in light of their full scope of equivalents.

What is claimed is:

1. A computer-implemented method for generating a trade calendar, comprising:
configuring a calendar generator having a processor and a memory by storing in the memory a trade calendar module, wherein the processor selectively executes the trade calendar module;
populating, by the processor executing at least a part of the trade calendar module, a trade calendar with information responsive to a query comprising search criteria for searching information pertaining to trade promotions, the trade calendar including each trade promotion that meets the search criteria;
enabling, by the processor, display of the trade calendar in a tabular format including a selection of dates;
enabling, by the processor, display of marketing activities corresponding to a portion of the information in the trade calendar; and
enabling, by the processor, selection from among at least two action association links and linking of two or more of the trade promotions using the selected action association link, wherein when a hard link is selected, activity with respect to a first trade promotion linked by the action association link triggers an alert or action pertaining to a second trade promotion linked to the first trade promotion by the action association link.

2. The method of claim 1, wherein the search criteria includes at least one of a promotable group, retailer, planning year, and product.

3. The method of claim 1, wherein marketing activities include at least one of a media campaign, TV advertising, radio advertising, and cinema advertising.

4. The method of claim 1, wherein parameters corresponding to the displayed marketing activities cannot be modified.

5. The method of claim 1, the enabling display of marketing activities comprises:
displaying the marketing activities in a split screen simultaneously with the displayed trade calendar.

6. The method of claim 1, further comprising enabling, by the processor, creation of a new trade promotion.

7. The method of claim 6, further comprising
enabling, by the processor, reception of information corresponding to the new trade promotion from a user; and
storing the information corresponding to the new trade promotion as a trade promotion object in the trade calendar module.

8. The method of claim 1, further comprising
enabling, by the processor, display of the marketing events corresponding to the portion of the information in the trade calendar in a hierarchical manner.

9. A computer-implemented method for generating a trade calendar, comprising:
configuring a calendar generator having a processor and a memory by storing in the memory a trade calendar module, wherein the processor selectively executes the trade calendar module;
populating, by the processor executing at least a part of the trade calendar module, a trade calendar with results from a query comprising search criteria for searching information pertaining to trade promotions, the results comprising each deal from the deal information that meets the search criteria;
enabling, by the processor, display of the trade calendar, wherein at least a portion of the results is displayed;
receiving input from a user indicating a deal selected from the displayed trade calendar;
receiving data pertaining to the deal, wherein the received data includes condition information;
creating a trade promotion from the deal selected from the displayed trade calendar using the received data;
requesting approval for the trade promotion;
receiving approval information corresponding to the trade promotion;
updating, by the processor, the trade calendar based on the approval information; and
storing, in the memory, the condition information in a promotion condition record.

10. The method of claim 9, wherein the search criteria includes at least one of a promotable group, retailer, planning year, and product.

11. The method of claim 9, wherein the received data includes a promotable group, geographic information, and time period.

12. The method of claim 11, wherein the received data further includes at least one of promotion type, tactics, and buying pattern type.

13. The method of claim 9, wherein the condition information comprises at least one of promotion type, payment type, and discount amount.

14. The method of claim 9, the requesting approval comprises:
changing a status of the trade promotion to a status reflecting that the trade promotion is ready to be reviewed for approval.

15. The method of claim 14, the requesting approval further comprises:
uploading the trade promotion to a server.

16. The method of claim 9, wherein the approval information reflects whether the trade promotion has been accepted or rejected.

17. The method of claim 9, the updating comprising:
associating the trade promotion with information indicating whether the trade promotion has been accepted or rejected.

18. The method of claim 9, the updating comprising:
color coding the trade promotion dependent on whether the trade promotion has been accepted or rejected.

19. The method of claim 9, further comprising:
enabling display of marketing activities that correspond to the displayed portion of the results.

20. The method of claim 19, wherein the marketing activities include at least one of a media campaign, TV advertising, radio advertising, and cinema advertising.

21. The method of claim 19, further comprising:
establishing, by the processor, a hard link between the displayed marketing activities and the displayed portion of the results, so that activity with respect to a displayed marketing activity triggers an action pertaining to a corresponding trade promotion, and activity with respect to a displayed trade promotion triggers an action pertaining to a corresponding marketing activity.

22. The method of claim 19, wherein parameters corresponding to the displayed marketing activities cannot be modified.

23. The method of claim 19, the enabling display comprises:
displaying the marketing activities in a split screen simultaneously with the displayed trade calendar.

24. An apparatus for generating a trade calendar, comprising:
means for launching a query comprising search criteria for searching information pertaining to trade promotions;
means for populating a trade calendar with information responsive to the query, including each trade promotion that meets the search criteria;
means for displaying the trade calendar;
means for simultaneously displaying marketing activities corresponding to a portion of the information in the trade calendar; and
means for selecting from among at least two action association links and linking two or more of the trade promotions using the selected action association link, wherein when a hard link is selected, activity with respect to a first trade promotion linked by the action association link triggers an alert or action pertaining to a second trade promotion linked to the first trade promotion by the action association link.

25. The apparatus of claim 24, wherein the search criteria includes at least one of a promotable group, retailer, planning year, and product.

26. The apparatus of claim 24, wherein marketing activities include at least one of a media campaign, TV advertising, radio advertising, and cinema advertising.

27. The apparatus of claim 24, wherein parameters corresponding to the displayed marketing activities cannot be modified.

28. The apparatus of claim 24, the means for displaying comprising:
means for displaying the marketing activities in a split screen with the displayed trade calendar.

29. The apparatus of claim 24, further comprising means for creating a new trade promotion.

30. The apparatus of claim 29, further comprising
means for receiving information corresponding to the new trade promotion from a user; and means for storing the information corresponding to the new trade promotion as a trade promotion object in the trade calendar module.

31. The apparatus of claim 24, further comprising means for displaying the marketing events corresponding to the portion of the information in the trade calendar in a hierarchical manner.

32. The computer-readable of claim 31, the method further comprising
receiving information corresponding to the new trade promotion from a user; and
storing the information corresponding to the new trade promotion as a trade promotion object in the trade calendar module.

33. The computer-readable of claim 31, the method further comprising
displaying the marketing events corresponding to the portion of the information in the trade calendar in a hierarchical manner.

34. An apparatus for generating a trade calendar, comprising:
means for launching a query comprising search criteria for searching stored deal information;
means for populating a trade calendar with results from the launched query, the results comprising each deal from the deal information that meets the search criteria;
means for displaying the trade calendar, wherein at least a portion of the results is displayed;
means for receiving input from a user indicating a deal selected from the displayed trade calendar;
means for receiving data pertaining to the deal, wherein the received data includes condition information;
means for creating a trade promotion from the deal selected from the displayed trade calendar using the received data;
means for requesting approval for the trade promotion;
means for receiving approval information corresponding to the trade promotion;
means for updating the trade calendar based on the approval information; and
means for storing the condition information in a promotion condition record.

35. The apparatus of claim 34, wherein the search criteria includes at least one of a promotable group, retailer, planning year, and product.

36. The apparatus of claim 34, wherein the received data includes a promotable group, geographic information, and time period.

37. The apparatus of claim 36, wherein the received data further includes at least one of promotion type, tactics, and buying pattern type.

38. The apparatus of claim 34, wherein the condition information comprises at least one of promotion type, payment type, and discount amount.

39. The apparatus of claim 34, the means for requesting comprising:
means for changing a status of the trade promotion to a status reflecting that the trade promotion is ready to be reviewed for approval.

40. The apparatus of claim 39, the means for requesting further comprising:
means for uploading the trade promotion to a server.

41. The apparatus of claim 34, wherein approval information reflects whether the trade promotion has been accepted or rejected.

42. The apparatus of claim 34, the means for updating comprising:
means for associating the trade promotion with information indicating whether the trade promotion has been accepted or rejected.

43. The apparatus of claim 34, the means for updating comprising:
means for color coding the trade promotion dependent on whether the trade promotion has been accepted or rejected.

44. The apparatus of claim 34, further comprising:
means for simultaneously displaying marketing activities that correspond to the displayed portion of the results.

45. The apparatus of claim 44, wherein marketing activities include at least one of a media campaign, TV advertising, radio advertising, and cinema advertising.

46. The apparatus of claim 44, further comprising:
means for establishing a hard link between the displayed marketing activities and the displayed portion of the results, so that activity with respect to a displayed marketing activity triggers an action pertaining to a corresponding trade promotion, and activity with respect to a displayed trade promotion triggers an action pertaining to a corresponding marketing activity.

47. The apparatus of claim 44, wherein parameters corresponding to the displayed marketing activities cannot be modified.

48. The apparatus of claim 44, the means for displaying comprising:
means for displaying the marketing activities in a split screen with the displayed trade calendar.

49. A computer-readable medium containing instructions for performing a method for generating a trade calendar, the method comprising:
launching a query comprising search criteria for searching information pertaining to trade promotions;
populating a trade calendar with information responsive to the query, including each trade promotion that meets the search criteria;
displaying the trade calendar;
simultaneously displaying marketing activities corresponding to a portion of the information in the trade calendar; and
selecting from among at least two action association links and linking two or more of the trade promotions using the selected action association link, wherein when a hard link is selected, activity with respect to a first trade promotion linked by the action association link triggers an alert or action pertaining to a second trade promotion linked to the first trade promotion by the action association link.

50. The computer-readable medium of claim 49, wherein the search criteria includes at least one of a promotable group, retailer, planning year, and product.

51. The computer-readable medium of claim 49, wherein marketing activities include at least one of a media campaign, TV advertising, radio advertising, and cinema advertising.

52. The computer-readable medium of claim 49, wherein parameters corresponding to the displayed marketing activities cannot be modified.

53. The computer-readable medium of claim 49, the displaying comprising:
displaying the marketing activities in a split screen with the displayed trade calendar.

54. The computer-readable medium of claim 49, the method further comprising creating a new trade promotion.

55. A computer-readable medium containing instructions for performing a method for generating a trade calendar, the method comprising:

launching a query comprising search criteria for searching stored deal information;

populating a trade calendar with results from the launched query, the results comprising each deal from the deal information that meets the search criteria;

displaying the trade calendar, wherein at least a portion of the results is displayed;

receiving input from a user indicating a deal selected from the displayed trade calendar;

receiving data pertaining to the deal, wherein the received data includes condition information;

creating a trade promotion from the deal selected from the displayed trade calendar using the received data;

requesting approval for the trade promotion;

receiving approval information corresponding to the trade promotion;

updating the trade calendar based on the approval information; and storing the condition information in a promotion condition record.

56. The computer-readable medium of claim 55, wherein the search criteria includes at least one of a promotable group, retailer, planning year, and product.

57. The computer-readable medium of claim 55, wherein the received data includes a promotable group, geographic information, and time period.

58. The computer-readable medium of claim 57, wherein the received data further includes at least one of promotion type, tactics, and buying pattern type.

59. The computer-readable medium of claim 55, wherein the condition information comprises at least one of promotion type, payment type, and discount amount.

60. The computer-readable medium of claim 55, the requesting comprising:

changing a status of the trade promotion to a status reflecting that the trade promotion is ready to be reviewed for approval.

61. The computer-readable medium of claim 60, the requesting further comprising:

uploading the trade promotion to a server.

62. The computer-readable medium of claim 55, wherein approval information reflects whether the trade promotion has been accepted or rejected.

63. The computer-readable medium of claim 55, the updating comprising:

associating the trade promotion with information indicating whether the trade promotion has been accepted or rejected.

64. The computer-readable medium of claim 55, the updating comprising:

color coding the trade promotion dependent on whether the trade promotion has been accepted or rejected.

65. The computer-readable medium of claim 55, further comprising:

simultaneously displaying marketing activities that correspond to the displayed portion of the results.

66. The computer-readable medium of claim 65, wherein marketing activities include at least one of a media campaign, TV advertising, radio advertising, and cinema advertising.

67. The computer-readable medium of claim 65, further comprising:

establishing a hard link between the displayed marketing activities and the displayed portion of the results, so that activity with respect to a displayed marketing activity triggers an action pertaining to a corresponding trade promotion, and activity with respect to a displayed trade promotion triggers an action pertaining to a corresponding marketing activity.

68. The computer-readable medium of claim 65, wherein parameters corresponding to the displayed marketing activities cannot be modified.

69. The computer-readable medium of claim 65, the displaying comprising:

displaying the marketing activities in a split screen with the displayed trade calendar.

70. An apparatus for generating a trade calendar, comprising:

a memory having a program that launches a query comprising search criteria for searching information pertaining to trade promotions; populates a trade calendar with information responsive to the query, including each trade promotion that meets the search criteria; displays the trade calendar; simultaneously displays marketing activities corresponding to a portion of the information in the trade calendar; and selects from among at least two action association links and links two or more of the trade promotions using the selected action association link, wherein when a hard link is selected, activity with respect to a first trade promotion linked by the action association link triggers an alert or action pertaining to a second trade promotion linked to the first trade promotion by the action association link; and a processor that runs the program.

71. An apparatus for generating a trade calendar, comprising:

a memory having a program that launches a query comprising search criteria for searching stored deal information; populates a trade calendar with results from the launched query, the results comprising each deal from the deal information that meets the search criteria; displays the trade calendar, wherein at least a portion of the results is displayed; receives input from a user indicating a deal selected from the displayed trade calendar; receives data pertaining to the deal, wherein the received data includes condition information; creates a trade promotion from the deal selected from the displayed trade calendar using the received data; requests approval for the trade promotion; receives approval information corresponding to the trade promotion; updates the trade calendar based on the approval information; and stores the condition information in a promotion condition record; and a processor that runs the program.

* * * * *